(12) United States Patent
Keller-Tuberg

(10) Patent No.: US 7,065,577 B1
(45) Date of Patent: Jun. 20, 2006

(54) FACILITATING IP-BASED MULTICASTING CONTROL CONNECTIONS

(75) Inventor: Stefan Keller-Tuberg, Raleigh, NC (US)

(73) Assignee: Alcatel, Paris (FR)

( * ) Notice: Subject to any disclaimer, the term of this patent is extended or adjusted under 35 U.S.C. 154(b) by 629 days.

(21) Appl. No.: 10/108,208

(22) Filed: Mar. 27, 2002

(51) Int. Cl.
*G06F 15/16* (2006.01)

(52) U.S. Cl. .................. 709/227; 370/389; 370/390

(58) Field of Classification Search ............... 709/200, 709/227; 370/389, 390
See application file for complete search history.

(56) References Cited

U.S. PATENT DOCUMENTS

| | | | |
|---|---|---|---|
| 5,831,975 A * | 11/1998 | Chen et al. ............... 370/256 |
| 6,671,276 B1 * | 12/2003 | Bakre et al. .............. 370/395.1 |
| 6,751,218 B1 * | 6/2004 | Hagirahim et al. ......... 370/390 |
| 6,788,696 B1 * | 9/2004 | Allan et al. ............... 370/411 |
| 6,856,676 B1 * | 2/2005 | Pirot et al. .............. 379/201.01 |
| 6,931,005 B1 * | 8/2005 | Wilhelm .................. 370/390 |
| 2002/0001310 A1 * | 1/2002 | Mai et al. ................ 370/390 |
| 2002/0097728 A1 * | 7/2002 | Hinderks et al. ........ 370/395.52 |
| 2002/0150094 A1 * | 10/2002 | Cheng et al. ............ 370/389 |
| 2002/0176403 A1 * | 11/2002 | Radian .................... 370/352 |
| 2003/0101243 A1 * | 5/2003 | Donahue et al. ......... 709/220 |
| 2003/0125021 A1 * | 7/2003 | Tell et al. .............. 455/426 |

\* cited by examiner

*Primary Examiner*—Marc D. Thompson
*Assistant Examiner*—Greg Bengzon
(74) *Attorney, Agent, or Firm*—Bobby D. Slaton; V. Lawrence Sewell

(57) ABSTRACT

One embodiment of the disclosures made herein is a method for implementing multicast control in a point-to-multipoint tree. In accordance with such method, an operation for translating a network element interface identifier associated with a first network element from a first type of network element interface identifier to a second type of network element interface identifier. The operation for translating the network element interface identifier generates a translated network element interface identifier corresponding to the second type of network element interface identifier and transmits the translated network element interface identifier from the first network element for reception by a second network element in response to successful translating the network element interface identifier. After initiating the operation for translating the network element interface identification, an operation is performed for creating a designated root of a point-to-multipoint tree. The operation for creating the designated root generates a root reference identifier of the first network element and transmits the root reference identifier from the first network element for reception by the second network element in response to successful creating the designated root.

26 Claims, 16 Drawing Sheets

FACILITATING IP-BASED MULTICASTING CONTROL CONNECTIONS

FIELD OF THE DISCLOSURE

The disclosures made herein relate generally to Internet Protocol (IP) multicast techniques and more particularly to protocols for facilitating IP-based multicasting via point-to-multipoint connections in a hierarchical network or network nodes.

BACKGROUND

Many public and private communication networks include hierarchical networks of Asynchronous Transfer Mode (ATM) layer equipment (i.e. deployed ATM network nodes). To provide new IP-based multicast services within such networks, it is necessary to enable IP multicasting capabilities within such networks. However, it is often not be feasible or desirable to retrofit IP layer capabilities or new hardware into deployed ATM network nodes of such networks.

ATM is becoming an increasingly important protocol for the mass-market delivery of high-speed IP services. ATM has been adopted as a preferred transport layer for such high-speed IP services. Streaming and broadcast video distribution solutions, which use Internet Group Management Protocol (IGMP) as the control mechanism for dynamically creating connections, are an example of such high-speed IP services. The growing demand for Asymmetric Digital Subscriber Line (ADSL) services, which are supported by ATM networks, is one reason for the importance of ATM and ATM networks. To support high-speed IP services over an ADSL access network, there exists a need for a solution to provide mediation between ATM and IP domains.

ATM Switched Virtual Circuits (SVCs) may be used to dynamically configure point to multipoint connections from a centralised control node. SVCs are normally established between two end devices although techniques also exist for terminating the signalling within the network. These alternate techniques provide the impression that the end user has terminated the signalling where as, the network has terminated it on their behalf. An example of the latter is a Soft Permanent Virtual Circuit (PVC) implementation).

A traditional ATM SVC approach is known to require the exchange of several messages between the network and either of the connection termination points each time a call is established. Through the life of an SVC connection, an ongoing exchange of messages is necessary. The requirement to exchange several messages in order to establish a connection adds to connection set-up latency. Under conditions of correlated connection set-ups (where simultaneous set-up attempts from tens or hundreds or more subscribers arrive in a very short space of time, say 1 second), the demands placed on a microprocessor that is managing the SVC service are high and performance may be less than desirable.

Secondly, the ongoing exchange of messages through the life of an SVC can also lead to significant loads being placed upon the microprocessors supervising the SVCs. Such significant loads occur particularly when there are hundreds of active SVC connections. This additional microprocessor load directly reduces the processing capacity with which the microprocessor would be able to execute additional call set-ups and tear downs.

By nature, IGMP is a dynamic call set-up protocol used within the IP world. In contrast, the community creating ATM standards has defined Switched Virtual Circuits (SVCs) to achieve the same purpose. It would therefore seem logical that an IP Gateway should initiate an ATM SVC towards the end user in response to the end user's request to initiate a multipoint flow. Unfortunately, this approach is not so optimal for a number of reasons. One reason is that many network operators considering IP multicast services have ruled out SVCs in their networks. Another reason is that nearly none of the subscriber ADSL equipment (e.g. subscriber ADSL modem) in use today is SVC capable. Yet another reason is that the SVC protocol is resource-intensive and brings considerable background load to network elements just keeping signaling channels alive. This background load limits the performance of SVC implementations when the instantaneous signaling load is high (correlated signaling). Multicast video applications are notorious for provoking correlated signaling events—such as during commercial breaks or at the end of a multicast program.

Insufficient memory in data processors of such deployed ATM network nodes is one reason why it would not be feasible or desirable to retrofit IP layer capabilities into deployed ATM network nodes of such networks. Such insufficient memory limits an ability to terminate an IP stack. Insufficient hardware resources for terminating additional IP connections and traffic is another reason why it is not feasible or desirable to retrofit IP layer capabilities into deployed ATM network nodes of such networks.

The cost and time associated with designing IP-based hardware capable of supporting IP-based multicast services in deployed ATM network nodes is one reason why it is often not desirable (e.g. financially practical) to retrofit such IP-based hardware into deployed ATM network nodes. Similarly, the significant cost associated with retrofitting such IP-based hardware into deployed ATM network nodes is another reason why it is often not desirable to retrofit deployed ATM network nodes with IP-based hardware. Still another reason is that a considerable duration of time and considerable coordination is required for retrofitting such IP-based hardware into a potentially large number of deployed ATM network nodes.

Therefore, facilitating IP-based multicasting via a hierarchical network in a manner that overcomes limitations associated with conventional implementations of IP multicasting capabilities and/or with conventional network capabilities is useful.

DETAILED DESCRIPTION OF THE FIGURES

Embodiments of the disclosures made herein pertain to the use a novel and useful protocol for establishing connections that achieves the substantially equivalent objectives as ATM SVC's. In particular, such a protocol is useful in implementing point-to-multipoint connections. Through the use of a protocol in accordance with embodiments of the disclosures made herein, there are fewer messages that need to be exchanged and fewer per-call overheads, thus leading to increased performance relative to conventional solutions.

A protocol in accordance with embodiments of the disclosures made herein includes a "Layer 2" and a "Layer 3". The protocol further includes a "Layer 1" that is based upon ATM AAL5 and the Layer 1 is, accordingly, not discussed herein if detail. The Layer 2 is designed in the spirit of Transmission Control Protocol (TCP). However, the Layer 2 is simplified in a manner that omits many of the capabilities conventionally associated with TCP. The role of the Layer 2 is to provide a reliable transport mechanism between a first network element (e.g. a centralized IP Gateway) and one or more other network elements (i.e. Distributed Network Element Controllers). The Layer 3 is specifically configured for multicast control applications. The Layer 3 includes a series of messages for initiating, controlling and clearing ATM point-to-multipoint connections. It is contemplated herein and should be appreciated that there are other viable known alternates for the Layer 2. Accordingly, functionality and utility associated with Layer 3 does not depend upon a particular implementation of Layer 2.

Such a protocol is simple relative to conventional solutions. This simplicity contributes to low processing overheads compared with ATM SVCs. Accordingly, the performance of Network Element Controllers will be higher under overload (correlated zapping) conditions. Furthermore, because the protocol is simple, it consumes little memory. It is therefore suitable for implementing within legacy Network Element Controllers that do not have much memory available in which to add new features.

Figure 1:
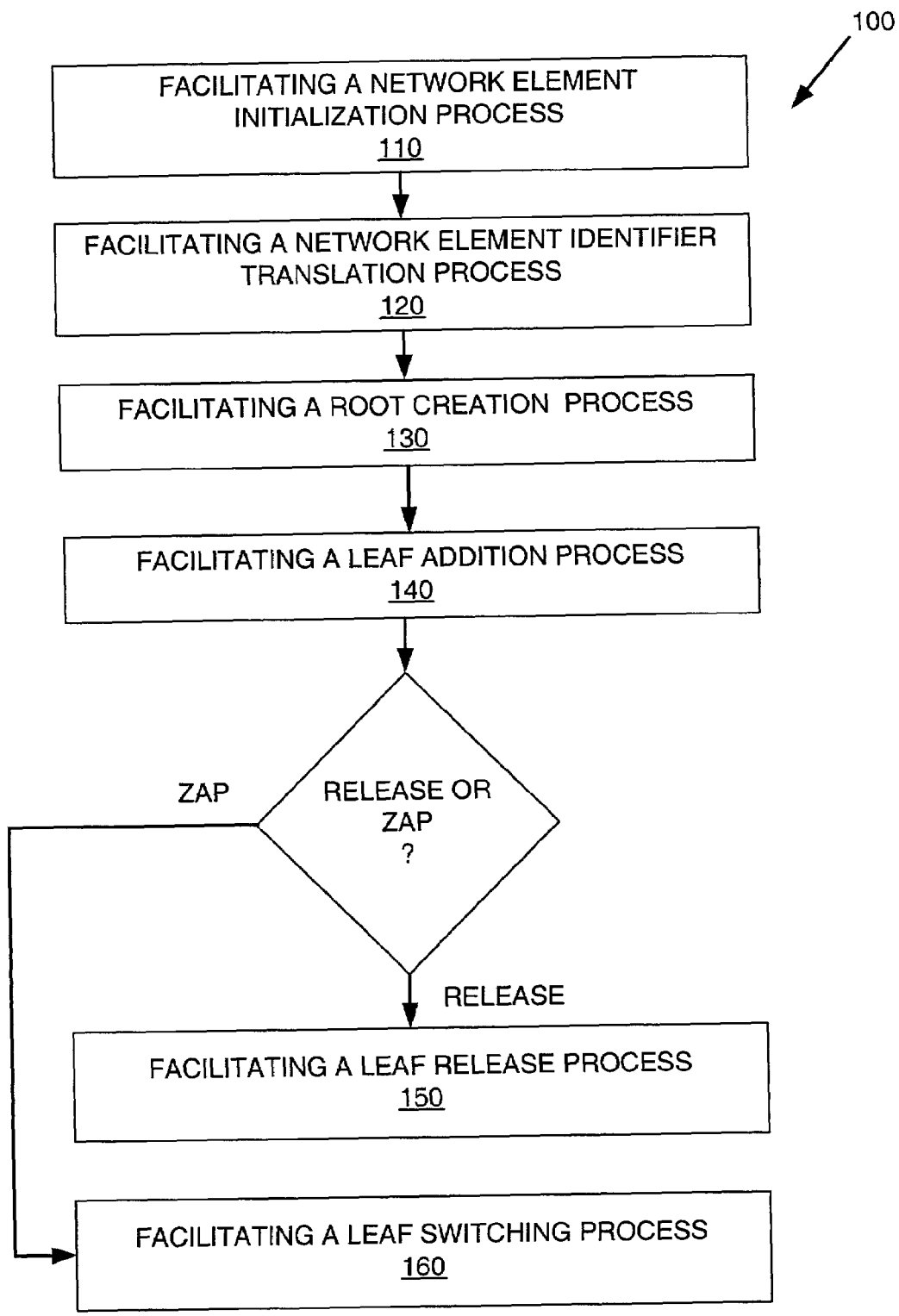
FIG. 1 is a flow chart view depicting a method for implementing point-to-multipoint connections in a hierarchical network of network nodes in accordance with an embodiment of the disclosures made herein.

Turning now to the drawing figures, a method 100 for implementing point-to-multipoint connections in a hierarchical network of network nodes in accordance with an embodiment of the disclosures made herein is depicted in FIG. 1. As discussed in greater detail below in reference to FIGS. 2 through 6, the method 100 includes processes that enable point-to-multipoint connections to be implemented in a manner that utilizes network resources more efficiently than conventional point-to-multipoint connection solutions. Accordingly, the method 100 and other methods for implementing point-to-multipoint connections in a hierarchical network of network nodes in accordance with an embodiment of the disclosures made herein are advantageous when utilized in combination with network element controllers that have only minimal memory available in which to add new features. Similarly, such methods consume less memory in network element controllers where available memory is not an issue, thus leaving more memory available for supporting other functionality and features.

A point to multipoint (or multicast) connection in an ATM network consists of two types of components: a root and one or more leaves. The name "point to multipoint" defining this class of connection is derived from the fact that the payload arrives at the ATM switch at a particular ingress point (the root) and after being duplicated or distributed within the switch, appears at multiple egress points (the leaves). When establishing a multipoint tree, it is natural to create the root part first and then to add and remove leaves as required. Therefore, it is common that the root is the first port of the multicast tree to be created and the last to be removed.

As depicted in FIG. 1, the method 100 begins with facilitating a network element initialization process 110. After facilitating the network element initialization process 110 successfully, a network element interface identifier translation process 120, a root creation process 130 and a leaf addition process 140 are facilitated, thus establishing a first point-to-multipoint tree comprising the root and the leaf. Although the leaf addition process 140 is depicted as being facilitated sequentially after facilitating the root creation process 130, it is contemplated herein that the root creation process 130 and the leaf addition process 140 may be performed in an essentially parallel manner. Likewise, it is further contemplated that a finite but non-zero time interval may elapse between the creation of the root and the addition of the first leaf.

At some point in time after the designated leaf is added, the designated leaf may be released from the first point-to-multipoint tree via a leaf release process, thus terminating the connection to an associated channel. Or, the designated leaf may be sequentially switched from the first point-to-multipoint tree to a second point-to-multipoint tree, thus switching the leaf from a first channel to a second channel.

Such sequential switching is commonly referred to as channel zapping. A leaf release process 150 may be facilitated for releasing the leaf from the first point-to-multipoint tree or a leaf switching process 160 (commonly referred to as a zap or channel zapping) may be facilitated for switching the leaf from the first point-to-multipoint tree to the second point-to-multipoint tree.

As depicted in FIG. 1, the root creation and the leaf addition processes are performed in succession and then a zap causing the switching or deletion of the leaf. Although not specifically shown, it is contemplated herein that a 'zap' may be performed before the addition of a leaf.

Figure 2:
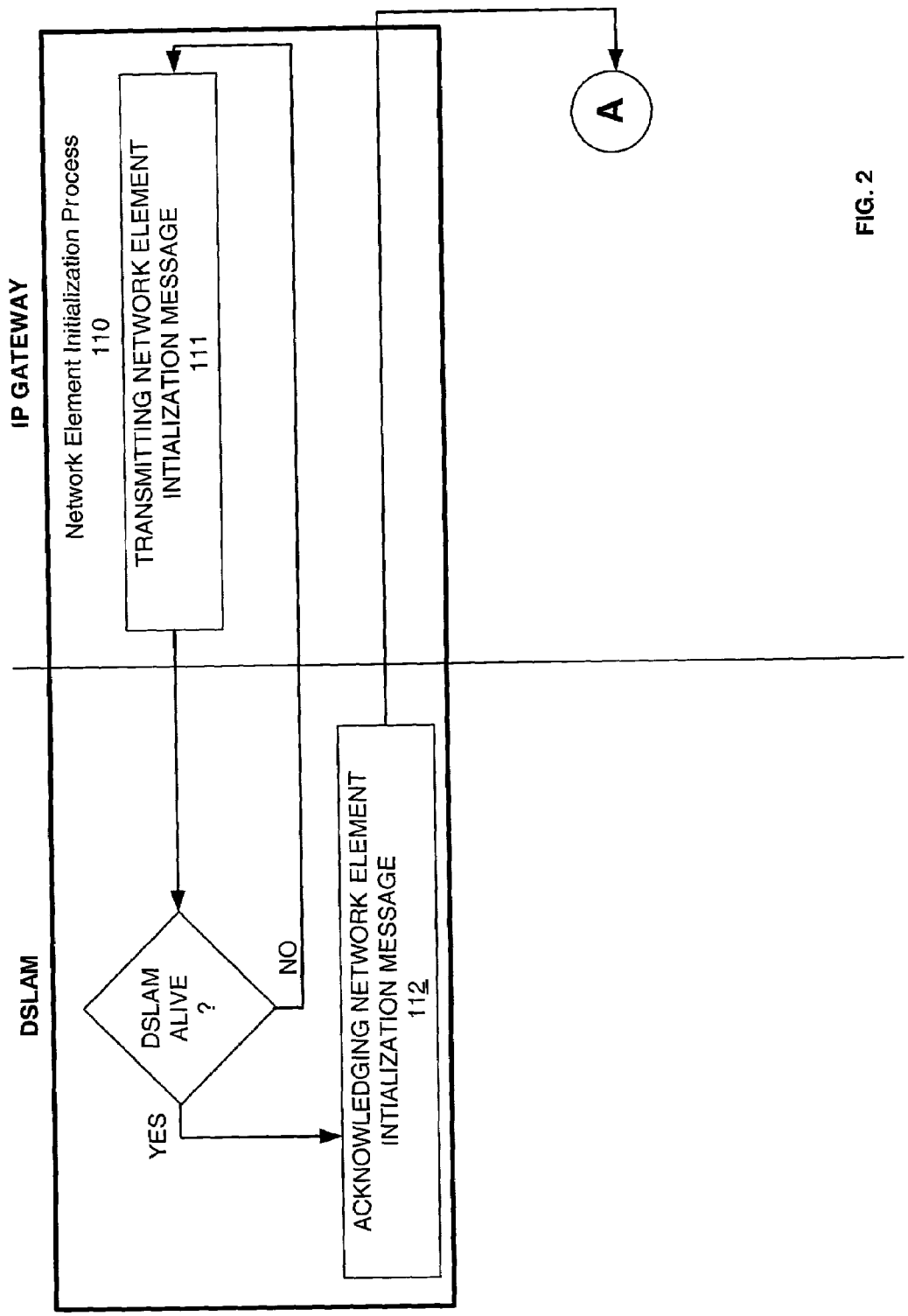
FIG. 2 is a flow chart view depicting a network element initialization process in accordance with an embodiment of the disclosures made herein.

An embodiment of the network element initialization process 110 is depicted in FIG. 2. The depicted embodiment of network element initialization process 110 begins with an operation 111 for transmitting a network element initialization message from an IP Gateway for reception by a Digital Subscriber Line Access Multiplexor (DSLAM) that is connected, such as within an ATM network, to the IP Gateway. The IP Gateway is an example of a multicast controller. A restart message is an example of the network element initialization message. In response to the DSLAM acknowledging the network element initialization message, the method 100 proceed to the network element interface identifier translation process 120. If after a prescribed period of time, the IP Gateway does not receive acknowledgement of the network element initialization message, the IP Gateway re-transmits the network element initialization message for reception by the DSLAM. Such re-transmission may continue for a prescribed number of times, until a prescribed period of time elapses or until another predefined condition occurs.

In at least one embodiment, the network element initialization process signals the DSLAM on the other side of a L3 link from the IP Gateway that a state of the IP Gateway has been reset to an initial state. Typically, this sort of a notification triggers an initialization dialogue between the two sides of the L3 link. If one of the two sides of the L3 link crashes and loses its state information, the network element initialization message is a means for a network element at one side of the link to inform a network element at another side of the link that it can no longer follow the state of the network element at the other side. When a restart and loss of state happens on one side, it is meaningless to continue the L3 dialogue until a full re-initialization takes place. Sending the network element initialization message (i.e. "an explicit L3 has restarted" message) is an effective and efficient means to recommence the initialization and to achieve an operational state once again.

Figure 3:
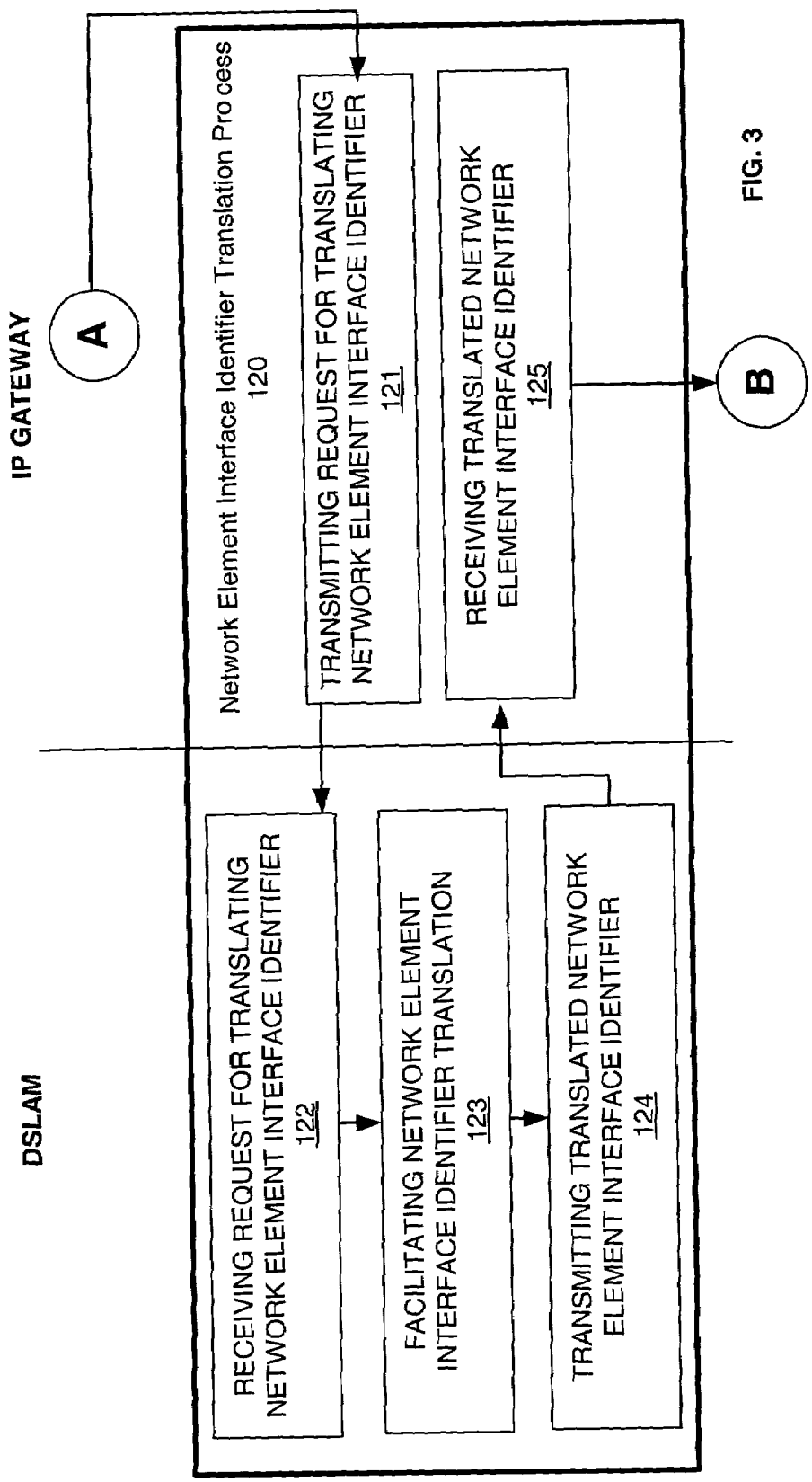
FIG. 3 is a flow chart view depicting a network element interface identifier translation process in accordance with an embodiment of the disclosures made herein.

An embodiment of the network element interface identifier translation process 120 is depicted in FIG. 3. The depicted embodiment of the network element interface identifier translation process 120 begins with an operation 121 for transmitting a request for translating the network element interface identifier from the IP Gateway for reception by the DSLAM. In response to the DSLAM performing an operation 122 for receiving the request for translating the network element interface identifier, the DSLAM performs an operation 123 for facilitating translation of the network element interface identifier, thus generating a translated network interface identifier. Thereafter, the DSLAM performs an operation 124 for transmitting the translated network element interface identifier for reception by the IP Gateway and the IP Gateway performs and operation 125 for receiving the translated network element interface identifier. Transmitting a translation acknowledgement message that includes the translated network element interface identifier is an example of transmitting the translated network element interface identifier for reception by the IP Gateway. It is contemplated herein that receiving the translated network element interface identifier may include retaining (e.g. storing) the translated network element interface identifier.

The DSLAM, or in general, any network element whose function is to interconnect a number of traffic paths, generally implements some form of human readable interface identifier to identify each of the physical interfaces which will carry the traffic. An example of a human readable interface identifier is the Alcatel 1000 and Alcatel 7300 ASAM methodologies of using Rack/Shelf/Slot/Port as a 4-dimensional coordinate. ASAMs are examples of network elements that consist of potentially many shelves of cards installed in potentially many racks of equipment. Such a 4-dimensional coordinate would be read as meaning 'the interface in question resides in a particular rack number, in a particular shelf number installed in that rack, in a card plugged into a particular slot number residing in that shelf, connected to a particular port number on that card".

Internally, the human readable interface identifier is often a cumbersome way to organize data. Normally, the internal form of representing a particular interface (i.e. the system readable interface identifier) follows a different form that often follows an electrical architecture of the system rather than the physical architecture defined by the human readable interface identifier. Alternately, the internal form of the human readable identifier may follow a logical representation of the architecture of the first network element or a representation of the way data is stored in memory. Most generally, the internal form of an interface identifier is designed to optimize the performance of one or more internal operations and will follow the form most natural for those operations that are to be optimized.

As an example, the architecture of a DSLAM may follow a bus topology in which a communications bus logically spans all of the shelves, cards and ports in the DSLAM. In order for the DSLAM's centralized control processor to refer individually to each of the devices (cards or ports) on the bus, it will use an internal identifier to represent each device. The internal identifier may be chosen to be an integer defining the devices' sequential position along the bus, or it may be an integer defining the devices' sequential priority on the bus, or it may be an integer representing the location of an internal memory structure holding critical information about a particular device, or it may be chosen from another criterion.

If the DSLAM relied on the human readable data representation for its internal operations, it would often need to perform calculations to translate the interface identifier from the human readable format into the system readable format each time an operation on the interface was required. When these calculations are complex or when they must be performed frequently, they require a significant proportion of the centralized control processor's time. Additional calculation time means that fewer operations can be performed per unit time interval, thus system throughput is lower or to achieve an equivalent level of throughput, a faster and more expensive processor is required.

It is typical that the structure and meaning of the fields in the system readable format of a port location is proprietary and only meaningful within the context of that network element. When two independent network elements must communicate with each other regarding an interface or device or other addressable entity, it is normal that they use the human readable nomenclature rather than the more efficient internal representation. The human readable form is preferable to the internal representation because the two different network elements may use different and incompatible internal representations for the same object.

In accordance with embodiments of the disclosures made herein, the two independent network elements are the DSLAM and IP Gateway (i.e. a multicast controller). The purpose of the translate interface identifier message is for the multicast controller to request that the DSLAM translate the human readable representation of the interface location (i.e. a positional designation as applies to a physical architecture) into the corresponding system readable (e.g. proprietary and implementation specific internal) representation of the port location. Accordingly, when the IP Gateway needs to refer to a particular interface in the DSLAM, it can then use the system readable interface identifier (i.e. the DSLAM readable interface identifier), thus saving the DSLAM the task of calculating (i.e. translating) the system readable interface identifier from the human readable interface identifier.

Even if a particular translated interface identifier is only ever used at one future instant in time (rather than multiple future instants), there is a benefit in having performed the translation ahead of time. The benefit is that the future operation may be completed in a shorter time than would otherwise have been possible. If the future operation was a channel zap (changing from one channel to another), then the latency of a zap using the translated interface identifier will be shorter than an equivalent zap using a human readable interface identifier. However, more typically, a multicast controller will need to refer to a particular interface many times during the span of the service, thus the performance gain from having saved many translation operations will be greater.

Figure 4:
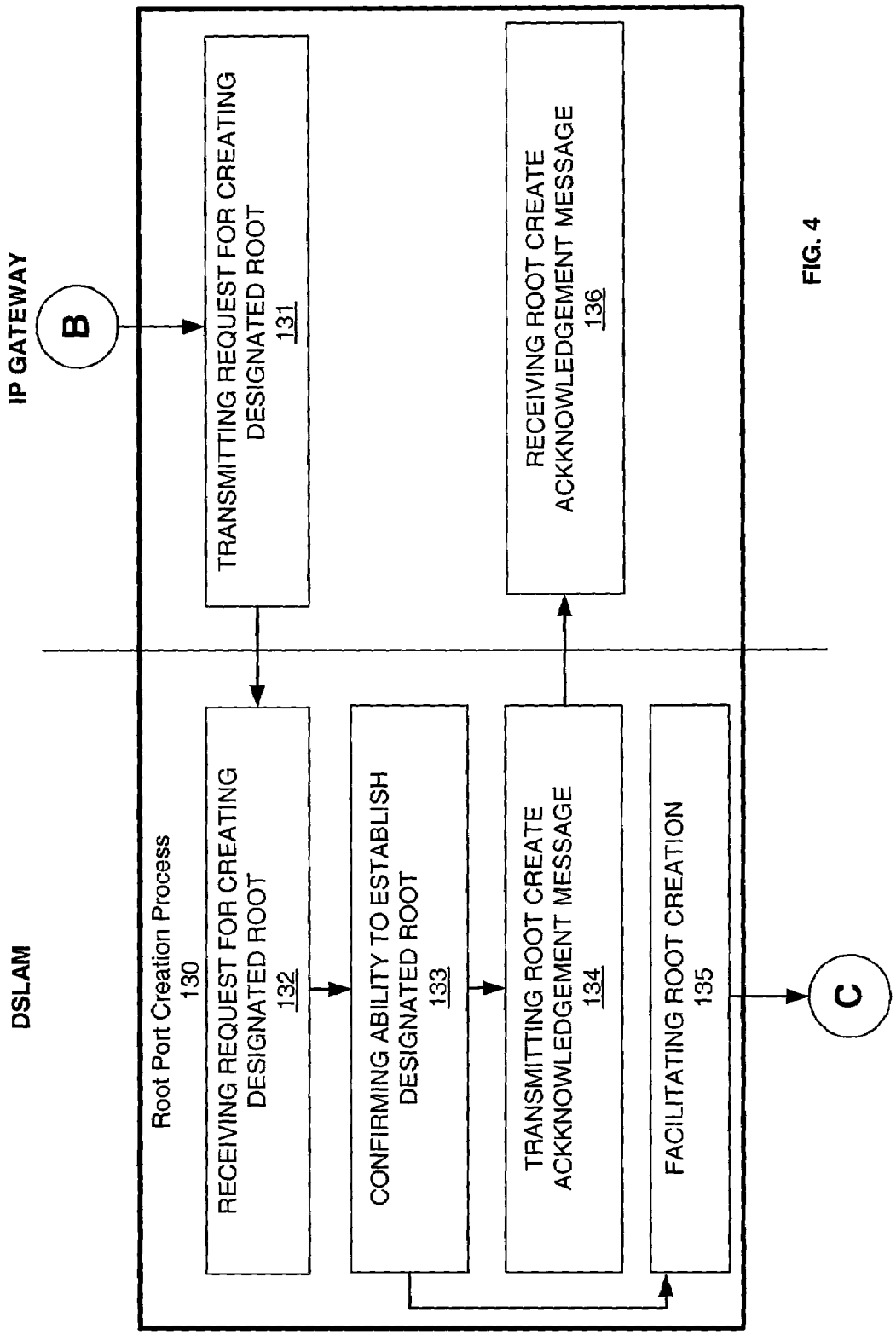
FIG. 4 is a flow chart view depicting a root creation process in accordance with an embodiment of the disclosures made herein.

An embodiment of the root creation process 130 is depicted in FIG. 4. The depicted embodiment of the root creation process 130 begins with an operation 131 for transmitting a request for creating a designated root from the IP Gateway for reception by the DSLAM. Transmitting a create root message is an example of transmitting the request for creating the designated root. The request for creating the designated root includes an IP Gateway specified root reference identifier (i.e. the requesting element specified root reference identifier). In response to the DSLAM performing an operation 132 for receiving the request for creating the designated root, the DSLAM performs an operation 133 for confirming an ability to establish the designated root. The IP Gateway specified root reference identifier is retained (e.g. stored) by the DSLAM for supporting subsequent operations and processes. Accordingly, in future dialogue from the DSLAM to the IP Gateway, specifying the IP Gateway specified root reference identifier saves the translation and recalculation operation at the IP Gateway, thus more efficiently utilizing system resources.

After confirming the ability to establish the designated root, the DSLAM performs an operation 134 for transmitting a root create acknowledgement message for reception by the IP Gateway and an operation 135 for facilitating creation of the root. After performing the operation 134 for transmitting the root create acknowledgement message, the IP Gateway performs an operation 136 for receiving the root create acknowledgement message. It is contemplated herein that facilitating the creation of a root may be performed autonomously during the initialization of a network element, or it could be performed upon receipt of a zap (e.g. an Internet Group management Protocol (IGMP) membership report).

Facilitating the root creation process enables similar efficiency advantage to that discussed above in reference to the translated network element interface identifier. The nature of a point-to-multipoint connection is that traffic enters an associated point-to-multipoint tree at a single point and is then replicated by the system such that an exact copy of the traffic exits at each of the leaves of the tree. Before accepting a request to establish a point-to-multipoint tree, a system (e.g. the DSLAM) must first verify that it has sufficient resources to establish the newly requested point-to-multipoint tree without causing any of the prior connections in the system to suffer degradation beyond what had formally been agreed for them. This process is commonly referred to a "Connection Admission Control" (CAC) process and is a typical process in any sort of switching device that purportedly offers service assurances of one form or another.

In the case of the root of a point-to-multipoint connection, the CAC process confirms that the interface that will hold the root of the requested point-to-multipoint tree has sufficient resources to receive the traffic that will arrive at the root. Typically when performing a CAC operation for a root, the CAC algorithm will also verify that the DSLAM (or switching device) has sufficient internal resources to distribute the root traffic at least through the main internal points of contention along the traffic path towards potential leaves. This implies that when making the request to establish a root, the requester must accurately specify the traffic characteristics of the stream that will arrive at the root and that the CAC process will, in good faith, use this information to determine whether it can accept the connection.

Once the CAC process has made this determination, it will determine a DSLAM specified root reference identifier (i.e. the implementing element specified root reference identifier). The DSLAM specified root reference identifier represents an internal reference identifier of the DSLAM for the designated root. It is contemplated herein that other information may also be determined and returned, such as an assignment for connection identifier (VP/VC). It is further contemplated herein that the DSLAM specified root reference identifier may be included in the root create acknowledgement message and that receiving the root create acknowledgement message may include retaining (e.g. storing) the DSLAM specified root reference identifier.

Using the DSLAM specified root reference identifier as a context reference, the DSLAM also typically remembers other critical information about the connection, such as the traffic characteristics, preferred path, multicast traffic characteristics, preferred traffic paths, alternate traffic paths, traffic priority, external connection identifiers, internal connection identifiers, references to associated data structures, a reference to the peer node which requested creation of the connection and a reference to a list of current leaves associated with the root. In this manner, the DSLAM associates such other critical information about the connection with the DSLAM specified root reference identifier. Accordingly, in future dialogue from the IP Gateway to the DSLAM, specifying the DSLAM specified root reference identifier saves the translation and recalculation operation at the DSLAM, thus more efficiently utilizing system resources.

Figure 5:
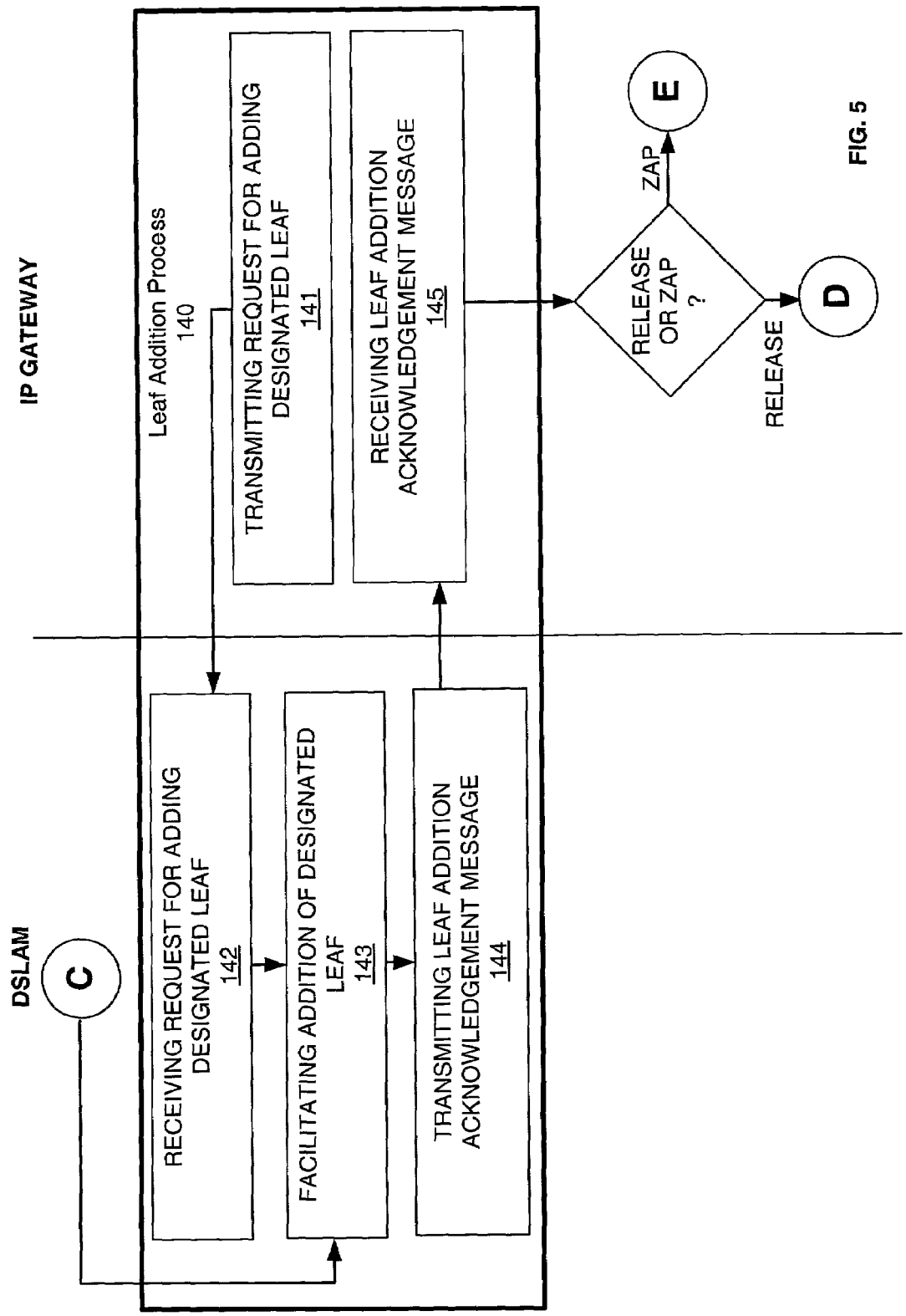
FIG. 5 is a flow chart view depicting a leaf addition process in accordance with an embodiment of the disclosures made herein.

An embodiment of the leaf addition process 140 is depicted in FIG. 5. The depicted embodiment of the leaf addition process 140 begins with the IP Gateway performing an operation 141 for transmitting a request for adding a designated leaf to the point-to-multipoint tree for reception by the DSLAM. Transmitting an add leaf message is an example of transmitting the request for adding the designated leaf. The request for adding the designated leaf includes an IP Gateway specified leaf reference identifier (i.e. the requesting element designated leaf reference identifier). In response to the DSLAM performing an operation 142 for receiving the request for adding the designated leaf, the DSLAM, if necessary, performs an additional CAC operation and if the connection is accepted, an operation 143 for facilitating addition of the designated leaf to the point-to-multipoint tree (i.e. at the first port of the DSLAM). The IP Gateway specified leaf reference identifier is retained (e.g. stored) by the DSLAM for supporting subsequent operations and processes. Accordingly, in future dialogue from the DSLAM to the IP Gateway, specifying the IP Gateway specified leaf reference identifier saves the translation and recalculation operation at the IP Gateway, thus more efficiently utilizing system resources.

It should be understood that the leaf connection is associated with a physical leaf port. However, the point-to-multipoint tree may have multiple independent leaf connections on the same leaf port.

The additional CAC operation for the leaf is to confirm resource availability along the traffic path that was not submitted to CAC when the root was created. It may not be necessary to perform an additional leaf CAC or the complexity of the leaf CAC operation may be reduced if the system pre-allocates resources to all subscribers of the multicast service. After performing the operation 143 for facilitating addition of the designated leaf, the DSLAM performs and operation 144 for transmitting a leaf addition acknowledgement message for reception by the IP Gateway and the IP gateway performs an operation 145 for receiving the leaf addition acknowledgement message.

The multicast controller uses the request for adding the designated leaf for requesting that a copy of a particular multicast stream be delivered to a designated interface. The IP Gateway specifies the root using the DSLAM specified root reference identifier and specifies the interface to receive the copy of the multicast stream using the translated network element interface identifier. When the operation 143 for facilitating addition of the designated leaf is successfully performed, the DSLAM transmits a DSLAM specified leaf reference identifier for reception by the IP Gateway, such as, for example, within the leaf addition acknowledgement message. The DSLAM specified leaf reference identifier refers to the particular leaf connection. The two end points already know the identifier for the port. When the leaf is added, a new identifier (i.e. the DSLAM specified leaf reference identifier) is returned in the acknowledgement—which refers specifically to the leaf connection that has just been added. Similar to the translated interface identifier and root reference identifiers described above, the purpose of the DSLAM specified leaf identifier is to allow more efficient follow up dialogue from the IP Gateway towards the DSLAM in correspondence relating to the designated leaf. It is contemplated herein that receiving the leaf addition acknowledgement message includes retaining (e.g. storing) the DSLAM specified leaf reference identifier.

Figure 6:
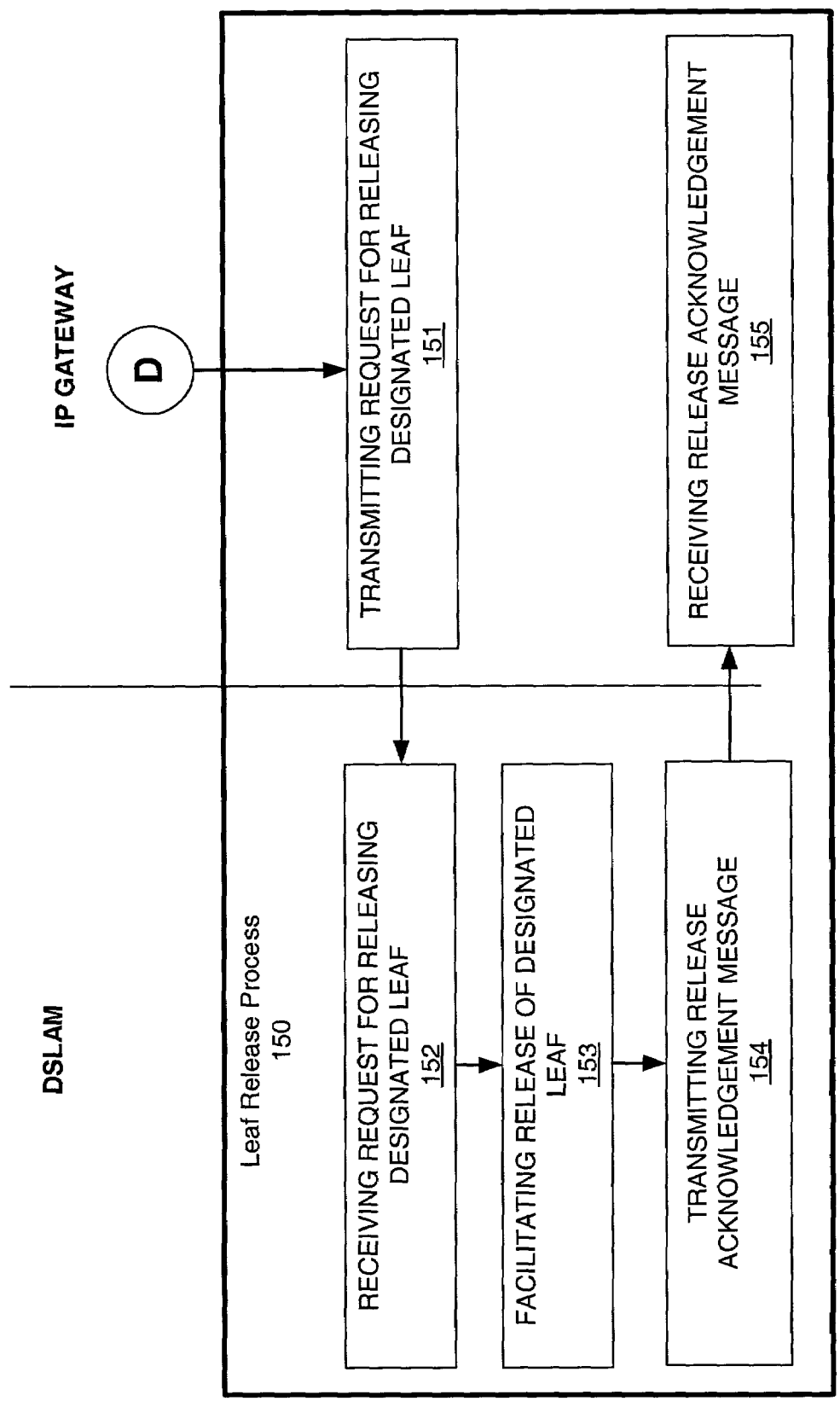
FIG. 6 is a flow chart view depicting a leaf release process in accordance with an embodiment of the disclosures made herein.

An embodiment of the leaf release process 150 is depicted in FIG. 6. The depicted embodiment of the leaf release process 150 begins with the IP Gateway performing an operation 151 for transmitting a request for releasing the designated leaf from the first point-to-multipoint tree (i.e. from the first root of the DSLAM). In response to the DSLAM performing an operation 152 for receiving the request for releasing the designated leaf, the DSLAM performs an operation 153 for facilitating release of the designated leaf from the first point-to-multipoint tree. The operation 153 for facilitating release of the designated leaf utilizes the DSLAM specified leaf reference identifier for implementing such release of the designated leaf. To this end, the request for releasing the designated leaf comprises the DSLAM specified leaf reference identifier. After performing the operation 153 for facilitating release of the designated leaf, the DSLAM performs an operation 154 for transmitting a release acknowledgement message for reception by the IP Gateway and the IP Gateway performs and operation 155 for receiving the release acknowledgement message.

Facilitating the release of a leaf may be performed as the result of a zap. But, more specifically, facilitating the release of a leaf is performed as a result of the receipt of an IGMP Leave message or as a result of the expiry of an IGMP Membership Query timer.

Figure 7:
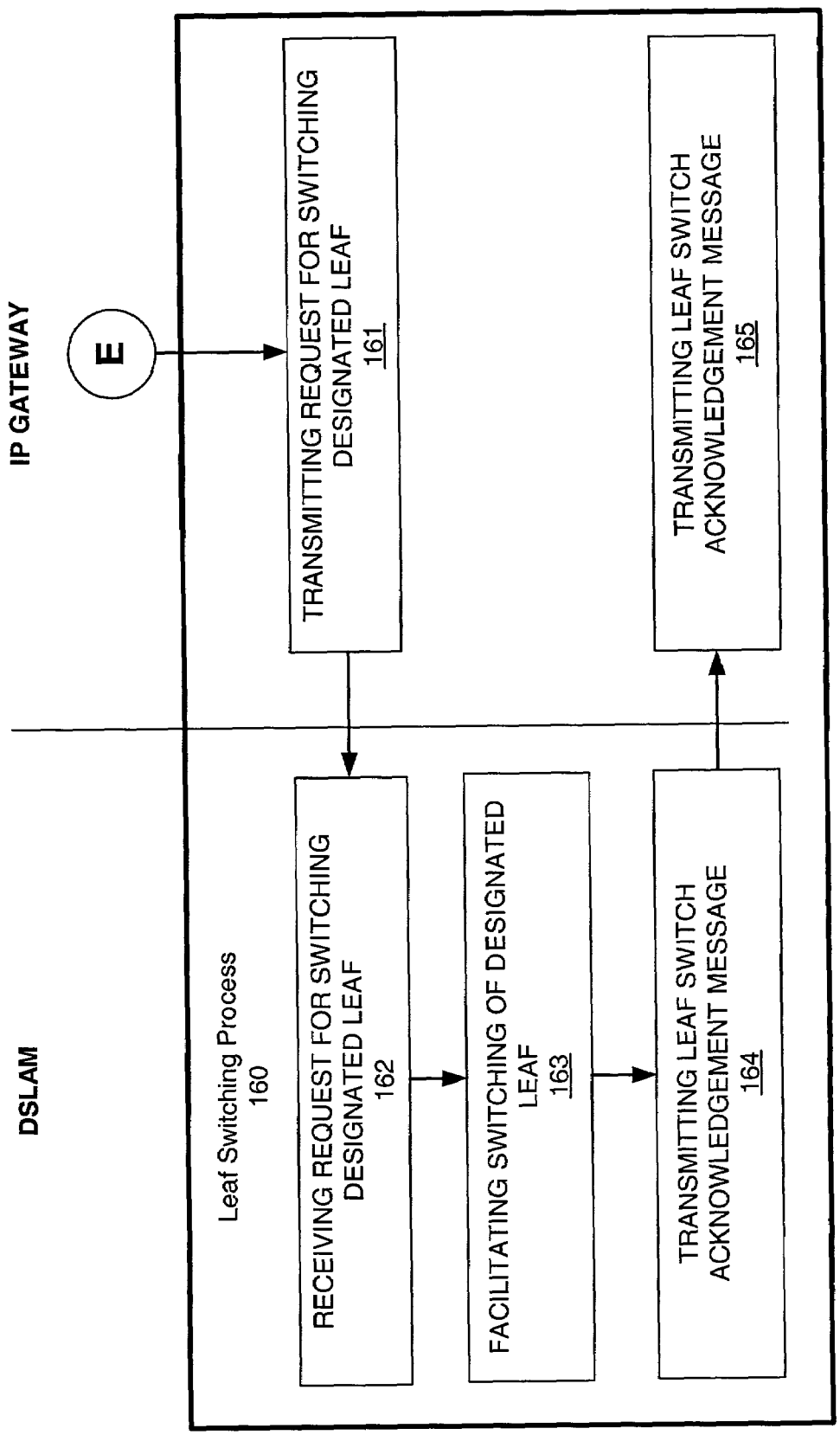
FIG. 7 is a flow chart view depicting a leaf switching process in accordance with an embodiment of the disclosures made herein.
Figure 8:
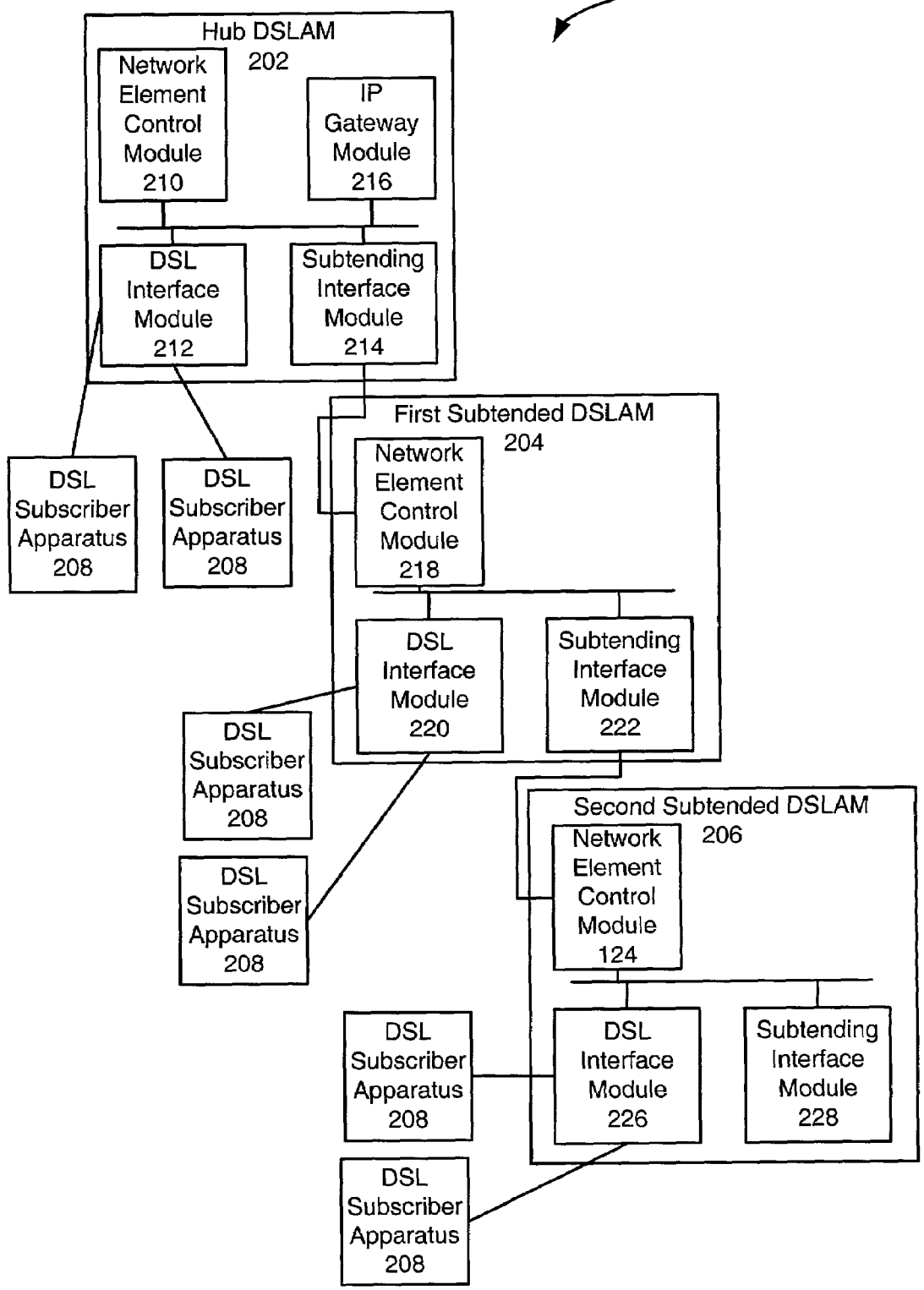
FIG. 8 is a block diagram view depicting a hierarchical network of network nodes capable of facilitating multicast control functionality in accordance with a first embodiment of the disclosures made herein.

An embodiment of the leaf switching process 160 is depicted in FIG. 7. The depicted embodiment of the leaf switching process 160 begins with the IP Gateway performing an operation 161 for transmitting a request for switching the designated leaf from the first point-to-multi-point tree (i.e. associated with the first root port) to the second point-to-multipoint tree (i.e. associated with a second root), thus switching the designated leaf from a first channel to a second channel. In response to the DSLAM performing an operation 162 for receiving the request for switching the designated leaf, the DSLAM performs an operation 163 for facilitating switching of the designated leaf from the first point-to-multi-point tree to the second point-to-multipoint tree.

The operation 163 for facilitating switching of the designated leaf utilizes the DSLAM specified leaf reference identifier for facilitating release of the designated leaf. To this end, the request for switching the designated leaf comprises the DSLAM specified leaf reference identifier. As switching involved releasing the designated leaf and then adding the designated leaf to a designated point-to-multi-point tree, the request for switching also includes the DSLAM specified leaf reference identifier discussed above. After performing the operation 163 for facilitating switching of the designated leaf, the DSLAM performs an operation 164 for transmitting a leaf switching acknowledgement message for reception by the IP Gateway and the IP Gateway performs and operation 165 for receiving the leaf switching acknowledgement message.

It is contemplated herein that hello-type messages may be exchanged between the IP Gateway and the DSLAM. Such hello-type messages are generally used when the Layer 2 protocol does not provide any polling functionality or when the layer 3 functionality is implemented on a network element that is independent from the network element providing the Layer 2 functionality. The purpose of the hello-type messages is such that in the absence of any Layer 3 activity, the Layer 3 entities on either side of a link can poll each other to check whether they are still operational. For example, the peer Layer 3 entity may become non-operation if, for example, the network connection is broken or if the processor hosting the peer layer 3 application was to crash or hang or if the peer layer 3 application was stopped for some exceptional reason. Accordingly, when a Layer 3 entity has not received any Layer 3 traffic from its peer for a pre-determined length of time, it will send a hello-type message to the peer. Upon receiving the hello-type, the peer will respond to the hello-type message. The application that originated the first hello-type message will then receive a response and know that its peer is operational. If on the other hand, a response is not forthcoming, the originating Layer 3 application can deduce that a fault has occurred in the network interconnecting the peer Layer 3 applications or in the peer Layer 3 application itself.

In one example of a fault, a Layer 3 application may hang because of a software error. The peer Layer 3 entity, using regular hello-type messages, would detect that the peer has stopped working and can take out-of-band steps, such as through raising an alarm, to have the peer Layer 3 entity corrected. By detecting failure of the peer Layer 3 application (or link to the peer Layer 3 application) at the earliest time, corrective action can also be instigated at the earliest time. In some types of fault, the halted peer Layer 3 application could be restarted and the service restored before any of the subscribers of the service had noticed that there was a disruption.

Scenarios are contemplated in which the level of layer 3 traffic is naturally low enough that hello-type messages will appear to be regularly issued at pre-determined intervals. For example, in a multicasting application, it would be common that for extended periods of time, there are no zapping events that need to be processed. This could happen, for example, at low rating viewing times (such as between midnight and dawn), or even during a popular program where the viewers are committed to their selected channels and do not wish to zap to a different channel. Regardless of the reason for an extended interval with no zaps, it is advantageous for the two Layer 3 entities to maintain their knowledge about the status of their peer.

It is further contemplated that hello-type messages can be used to convey additional meanings between the layer 3 end points. An example of an additional meaning that could be conveyed is in providing an indication of an end point's instantaneous resource availability. Knowledge of a peer end point's resource availability is useful for activating load control or congestion avoidance mechanisms. The overall performance of the multicast service may be improved by having the layer 3 peers adjust their behaviour according to instantaneous load.

FIGS. 8–11 depict a communication apparatus 200, including an integrated IP Gateway module, capable of carrying out the method 100 disclosed herein. The communication apparatus 200 includes a hub DSLAM 202, a first subtended DSLAM 204, a second subtended DSLAM 206 and a plurality of DSL subscriber apparatuses 208. Although two subtended DSLAMs are shown, it is contemplated that the communication apparatus 200 and other apparatuses in accordance with embodiments of the disclosures made herein may include fewer or more than two subtended DSLAMS. A computer system having a DSL modem connected thereto is an example of a DSL subscriber apparatus.

The communication apparatus 200 depicts an example of a tree of DSLAMs being controlled by the IP gateway module 216, wherein the IP gateway module 216 is internal to the tree. The first and the second subtended DSLAMS (204, 206) define a branch of subtended DSLAMs. It is contemplated herein that one or more other branches of subtended DSLAMs (not shown) may be connected to the hub DSLAM 202.

It should be understood that a DSLAM is one example of a network element of a network node. Accordingly, the hub DSLAM 202, the first DSLAM 204 and the second DSLAM 206 are examples of network elements of respective network nodes. Such respective network nodes may comprise one or more DSLAMs as well as other types of network elements.

The hub DSLAM 202 includes a network element control module 210, a DSL interface module 212, a subtending interface module 214 and an IP gateway module 216. The network element control module 210, the DSL interface module 212, the subtending interface module 214 and the IP gateway module 216 are interconnected for enabling communication therebetween. The network element control module 210 at least partially controls operation of various network elements (e.g. the DSL interface module 212, the subtending interface module 214 and the IP gateway module 216, etc) of the hub DSLAM 202. The DSL Interface module 212 enables communication between the hub DSLAM 202 and the plurality of DSL subscriber apparatus 208 connected to the hub DSLAM 202. The subtending interface module 214 supports communication between the hub DSLAM 202 and the first subtended DSLAM 204.

The IP gateway module 216 manages IP multicast control functionality between the hub DSLAM 202 and at least a portion of the DSLAMs that subtend from the hub DSLAM 202 (e.g. the first subtending DSLAM 204 and the second subtending DSLAM 206). Managing multicast control connections is an example of managing multicast control functionality. Furthermore, the IP gateway module 216 manages IP multicast control functionality between the hub DSLAM 202 and DSL subscriber apparatuses 208 connected to the Hub DSLAM 202 and to any subtending DSLAMs under its management. Additional details regarding the operation, implementation and advantages of an IP gateway module in accordance with embodiments of the disclosures made herein are discussed below.

The first subtending DSLAM 204 includes a network element control module 218, a DSL interface module 220 and a subtending interface module 222. The network element control module 218, the DSL interface module 220 and the subtending interface module 222 are interconnected for enabling communication therebetween. The network element control module 218 at least partially controls operation of various network elements (e.g. the DSL interface module 220 and the subtending interface module 222) of the first subtending DSLAM 204. Furthermore, the network element control module 218 of the first subtended DSLAM 204 is connected to the subtending interface module 214 of the hub DSLAM 202, thus enabling communication between the hub DSLAM 202 and the first subtended DSLAM 204. The DSL Interface module 220 enables communication between the first subtended DSLAM 204 and the plurality of DSL subscriber apparatuses 208 connected to the first subtended DSLAM 204. The subtending interface module 222 supports communication between the first subtending DSLAM 204 and the second subtended DSLAM 206.

The second subtending DSLAM 206 includes a network element control module 224, a DSL interface module 226 and a subtending interface module 228. The network element control module 224, the DSL interface module 226 and the subtending interface module 228 are interconnected for enabling communication therebetween. The network element control module 224 of the second subtended DSLAM 206 is connected to the subtending interface module 222 of the first subtended DSLAM 204, thus enabling communication between the first subtended DSLAM 204 and the second subtended DSLAM 206.

The second subtended DSLAM 206 is capable of providing multicast control functionality that is essentially identical to that of the first subtending DSLAM 204. In a first embodiment of the second subtending DSLAM 206 (shown), the architecture of the second subtending DSLAM 206 is essentially identical to that of the first subtending DSLAM 204. In a second embodiment of the second subtending DSLAM 206, the architecture of the second subtending DSLAM 206 is different than that of the first subtending DSLAM 204, although the second subtending DSLAM 206 is capable of providing multicast control functionality that is essentially identical to that of the first subtending DSLAM 204.

Figure 9:
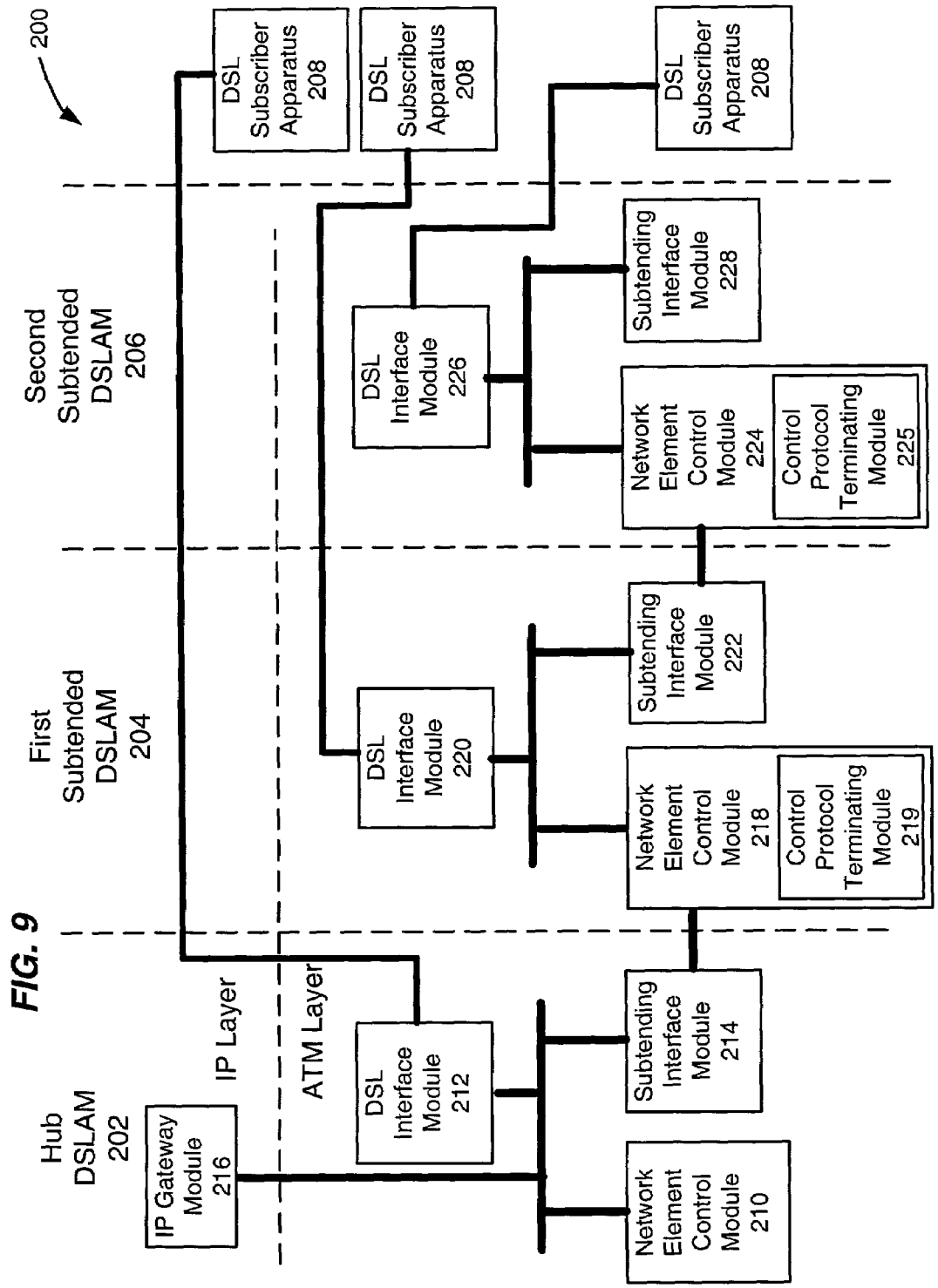
FIG. 9 is a block diagram view depicting the relationship of network elements of the hierarchical network of network nodes depicted in FIG. 8 in relation to an IP layer and an ATM layer.

As depicted in FIG. 9, the network element control modules (218, 224) of the first and the second subtended DSLAMs (204, 206) each include a respective control protocol terminating module (219, 225). Furthermore, the IP gateway module 216 is implemented at an IP layer of the hub DSLAM 202 and the control protocol terminating modules (219, 225) are each implemented at an Asynchronous Transfer Mode (ATM) layer of the first and the second subtended DSLAMs (204, 206). The control protocol terminating modules (219, 225) are capable of terminating a control protocol of the IP gateway module 216. In this manner, the IP gateway module 216 is capable managing multicast control functionality of the first and the second subtended DSLAMs (204, 206) and any other suitable configured subtended DSLAMs associated therewith.

It is contemplated herein that in other embodiments of a control protocol terminating module (not shown), the control protocol terminating module may be a separate module (e.g. a separate network element of a network node) rather than a module integrated within a network control module as depicted herein. It is further contemplated herein that functionality of a protocol terminating module in accordance with the disclosures made herein may be integrated with another module (e.g. the network element module, Subtending interface module, etc). In this manner, control protocol terminating functionality is provided without the need for a discrete or integrated control protocol termination module.

Figure 10:
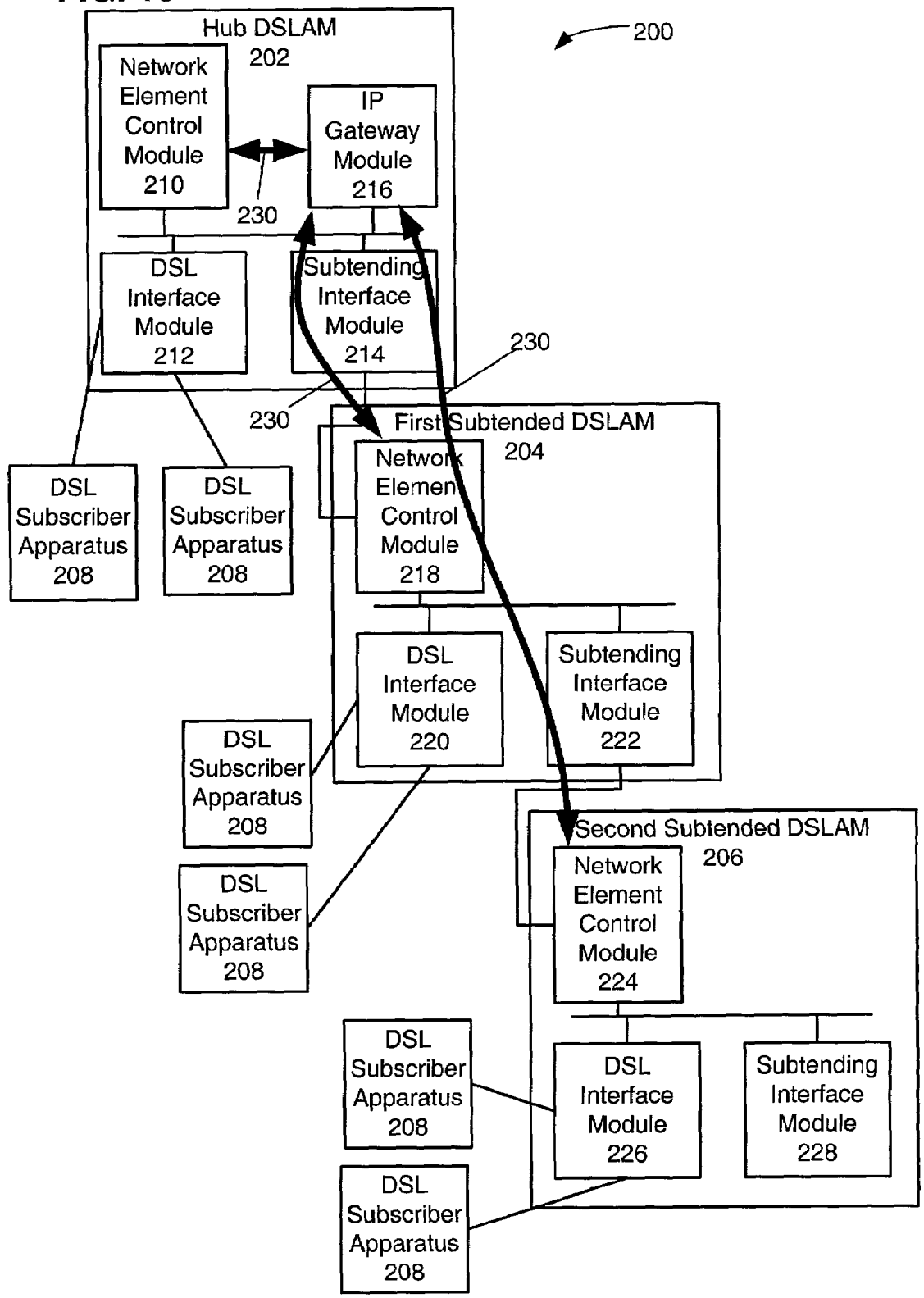
FIG. 10 is a block diagram view depicting DSLAM control connections managed by an IP gateway module of the hierarchical network of network nodes depicted in FIG. 8.

As depicted in FIG. 10, centralized multicast control functionality in accordance with the disclosures made herein enable a control connection 230 to be established between the hub DSLAM 202 and each DSLAM subtended with respect to the hub DSLAM 202 (e.g. the first and the second subtended DSLAMs 204, 206). Accordingly, the IP gateway module 216 is able to instruct the network element control modules (218, 224) of the first and the second subtended DSLAMs (204, 206) to perform functions such as establishing and clearing multicast control connections. One or more network elements of each DSLAM (e.g. network element control modules and/or subtending interface modules) participate in enabling each control connection 230 being established.

Figure 11:
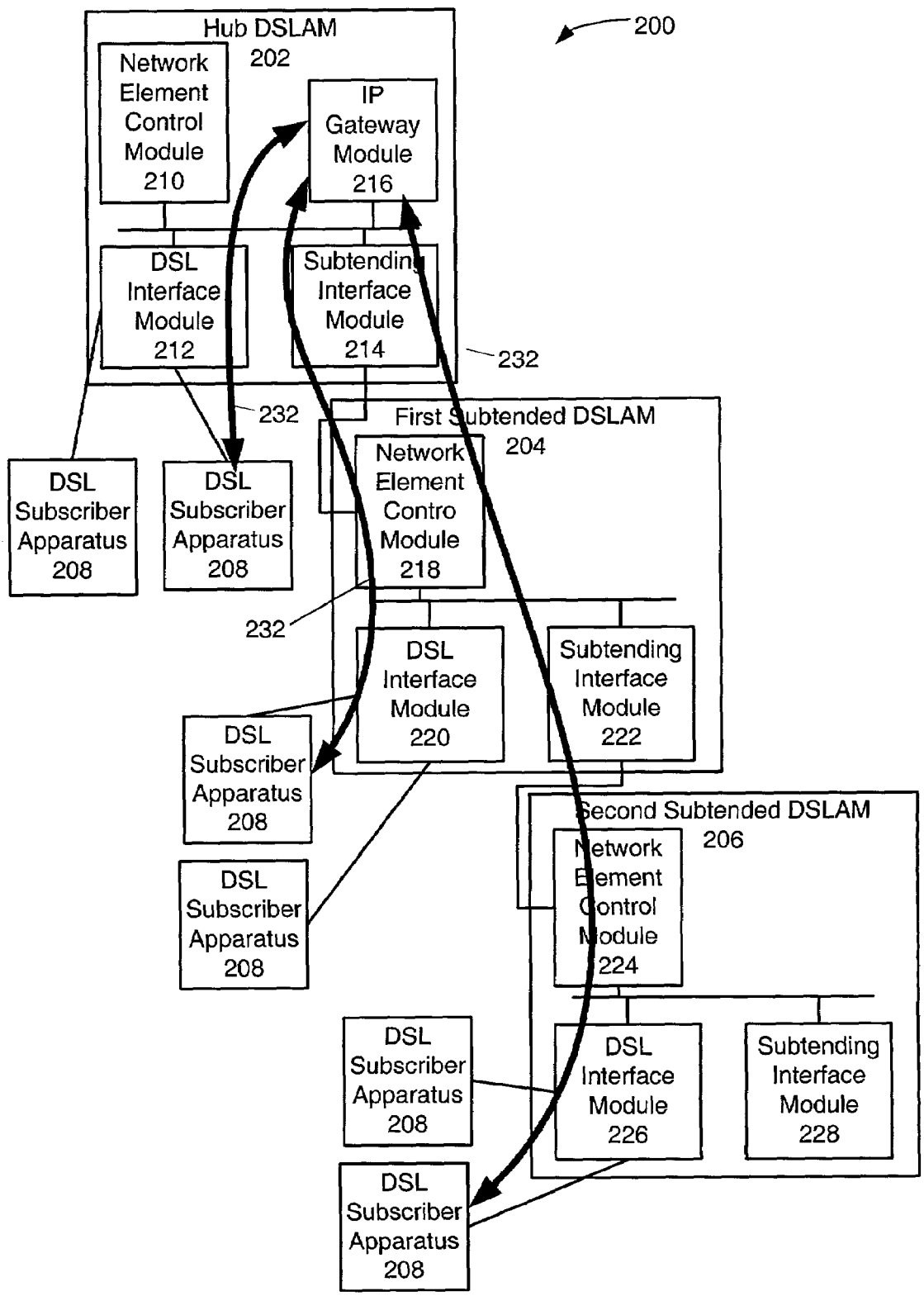
FIG. 11 is a block diagram view depicting DSL subscriber apparatus control connections managed by an IP gateway module of the hierarchical network of network nodes depicted in FIG. 8.
Figure 12:
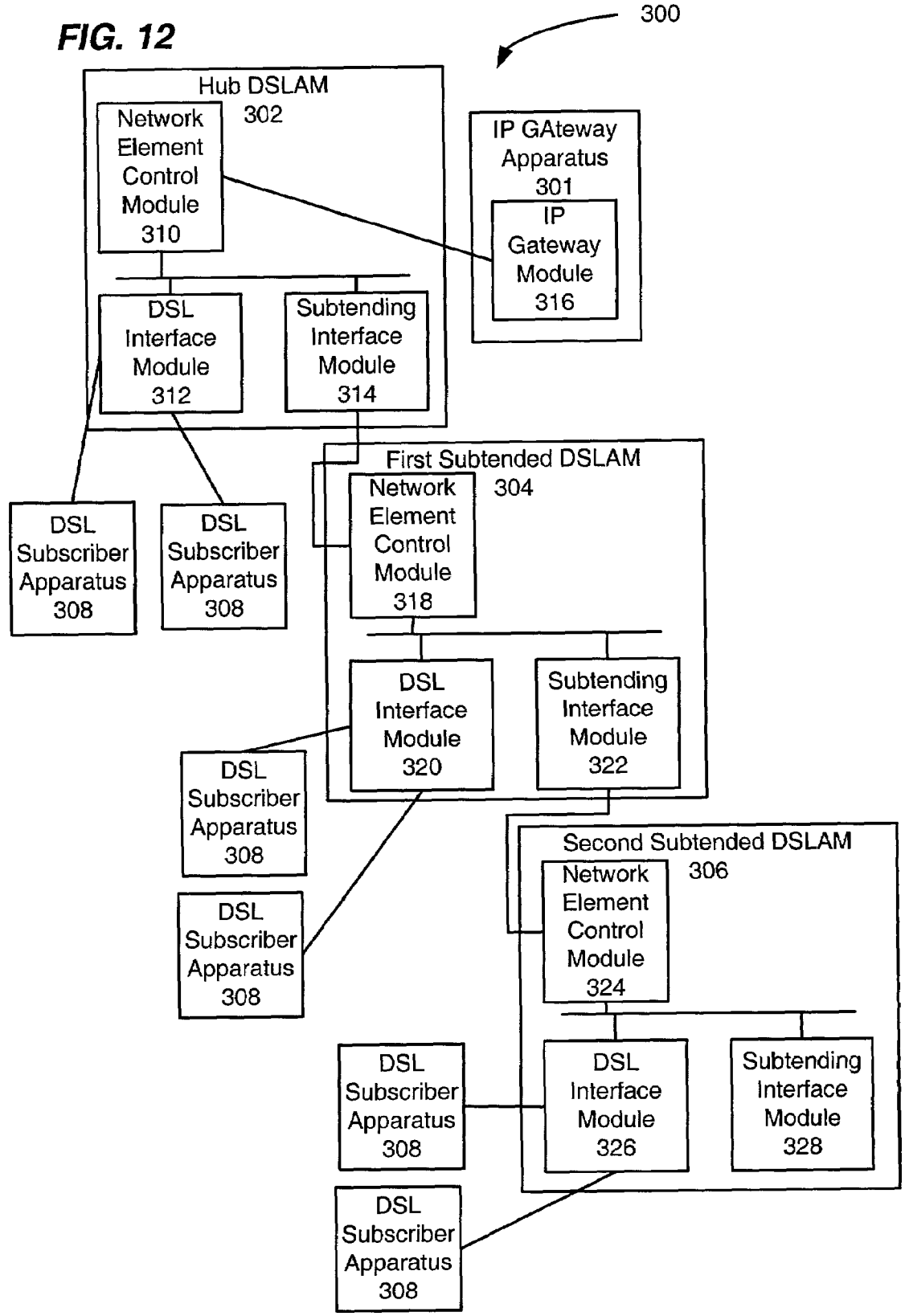
FIG. 12 is a block diagram view depicting a hierarchical network of network nodes capable of facilitating multicast control functionality in accordance with a second embodiment of the disclosures made herein.

As depicted in FIG. 11, centralized multicast control functionality in accordance with the disclosures made herein enable control connections 232 to be established between the hub DSLAM 202 and each DSL subscriber apparatuses 208 of the communication apparatus 200 such that the DSL subscriber apparatuses 208 are able to communicate with the IP gateway module 216. One or more network elements of each DSLAM (e.g. DSL interface modules, network element control modules and/or subtending interface modules) participate in enabling each control connection 232 being established.

FIGS. 12–15 depict a communication apparatus 300, including a stand-alone IP Gateway module, which is capable of carrying out the method 100 disclosed herein. FIGS. 12–15 depict a communication apparatus 300 in accordance with a second embodiment of the disclosures made herein. The communication apparatus 300 includes an IP gateway apparatus 301, a hub DSLAM 302, a first subtended DSLAM 304, a second subtended DSLAM 306 and a plurality of DSL subscriber apparatuses 308. Although two subtended DSLAMs are shown, it is contemplated that the communication apparatus 300 and other apparatuses in accordance with embodiments of the disclosures made herein may include fewer or more than two subtended DSLAMS.

The communication apparatus 300 depicts an example of a tree of DSLAMs being controlled by the IP gateway 301, wherein the IP gateway apparatus 301 is external to the tree. The first and the second subtended DSLAMS (304, 306) define a branch of subtended DSLAMs. It is contemplated herein that one or more other branches of subtended DSLAMs (not shown) may be connected to the hub DSLAM 302.

It should be understood that that a DSLAM is one example of a network element of a network node. Accordingly, the hub DSLAM 302, the first DSLAM 304 and the second DSLAM 306 are examples of network elements of respective network nodes. Such respective network nodes may comprise one or more DSLAMs as well as other types of network elements.

The hub DSLAM 302 includes a network element control module 310, a DSL interface module 312 and a subtending interface module 314. The network element control module 310, the DSL interface module 312 and the subtending interface module 314 are interconnected for enabling communication therebetween. The network element control module 310 at least partially controls operation of various network elements (e.g. the DSL interface module 312 and the subtending interface module 314, etc) of the hub DSLAM 302. The DSL Interface module 312 enables communication between the hub DSLAM 302 and the plurality of DSL subscriber apparatuses 308 connected to the hub DSLAM 302. The subtending interface module 314 supports communication between the hub DSLAM 302 and the first subtended DSLAM 304.

The IP gateway apparatus 301 includes an IP gateway module 316 capable of managing IP multicast control functionality between the hub DSLAM 302 and at least a portion of the DSLAMs that subtend from the hub DSLAM 302 (e.g. the first subtending DSLAM 304 and the second subtending DSLAM 306). Furthermore, the IP gateway module 316 manages IP multicast control functionality between the hub DSLAM 302 and DSL subscriber apparatuses 308 connected to the Hub DSLAM 302 and to any subtending DSLAMs under its management. The IP gateway apparatus 301 is not implemented within the tree of DSLAMs. The IP gateway apparatus 301 is a device that is capable of being a network element within or adjacent to an ATM network that is serving the subtended tree of DSLAMs. Additional details regarding the operation, implementation and advantages of an IP gateway module in accordance with embodiments of the disclosures made herein are discussed below.

The first subtending DSLAM 304 includes a network element control module 318, a DSL interface module 320 and a subtending interface module 322. The network element control module 318, the DSL interface module 320 and the subtending interface module 322 are interconnected for enabling communication therebetween. The network element control module 318 at least partially controls operation of various network elements (e.g. the DSL interface module 320 and the subtending interface module 322) of the first subtending DSLAM 304. Furthermore, the network element control module 318 of the first subtended DSLAM 304 is connected to the subtending interface module 314 of the hub DSLAM 302, thus enabling communication between the hub DSLAM 302 and the first subtended DSLAM 304. The DSL Interface module 320 enables communication between the first subtended DSLAM 104 and the plurality of DSL subscriber apparatuses 308 connected to the first subtended DSLAM 304. The subtending interface module 322 supports communication between the first subtending DSLAM 104 and the second subtended DSLAM 106.

The second subtending DSLAM 306 includes a network element control module 324, a DSL interface module 326 and a subtending interface module 328. The network element control module 324, the DSL interface module 326 and the subtending interface module 328 are interconnected for enabling communication therebetween. The network element control module 324 of the second subtended DSLAM 306 is connected to the subtending interface module 322 of the first subtended DSLAM 304, thus enabling communication between the first subtended DSLAM 304 and the second subtended DSLAM 306.

The second subtended DSLAM 306 is capable of providing multicast control functionality that is essentially identical to that of the first subtending DSLAM 304. In a first embodiment of the second subtending DSLAM 306 (shown), the architecture of the second subtending DSLAM 306 is essentially identical to that of the first subtending DSLAM 304. In a second embodiment of the second subtending DSLAM 306, the architecture of the second subtending DSLAM 306 is different than that of the first subtending DSLAM 304, although the second subtending DSLAM 306 is capable of providing multicast control functionality that is essentially identical to that of the first subtending DSLAM 304.

Figure 13:
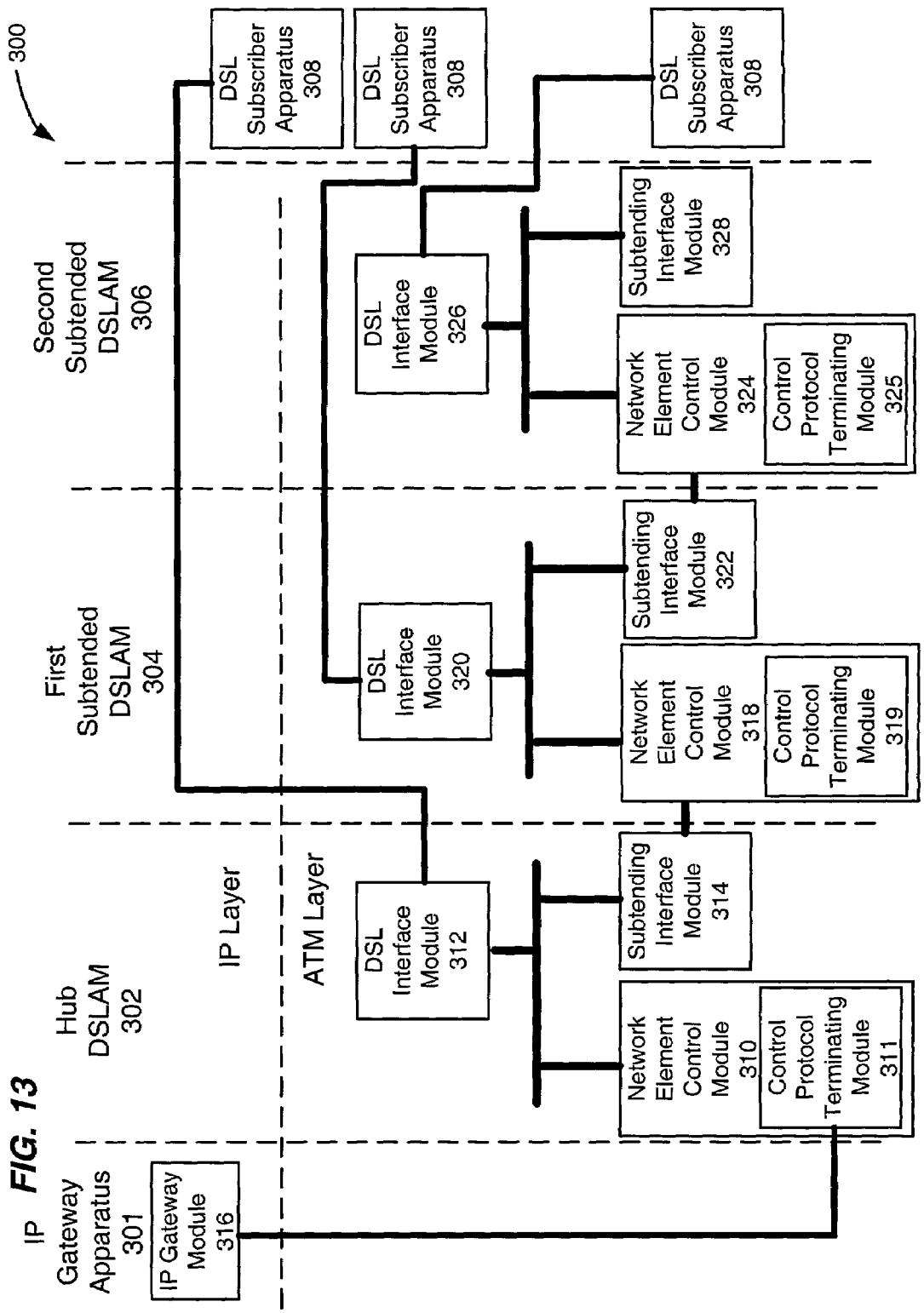
FIG. 13 is a block diagram view depicting the relationship of network elements of the hierarchical network of network nodes depicted in FIG. 12 in relation to an IP layer and an ATM layer.

As depicted in FIG. 13, the network element control modules (310, 318, 324) of the hub DSLAM 302, first subtended DSLAM 304 and the second subtended DSLAM 306 each include a respective control protocol terminating module (311, 319, 325). Furthermore, the IP gateway module 316 is implemented at an IP layer of the hub DSLAM 302 and the control protocol terminating modules (311, 319, 325) are each implemented at an Asynchronous Transfer Mode (ATM) layer of the hub DSLAM 302, the first subtended DSLAM 304 and the second subtended DSLAM 306. The control protocol terminating modules (319, 325) are capable of terminating a control protocol of the IP gateway module 316. In this manner, the IP gateway module 316 is capable managing multicast control functionality of the first and the second subtended DSLAMs (304, 306) and any other suitable configured subtended DSLAMs associated therewith.

Figure 14:
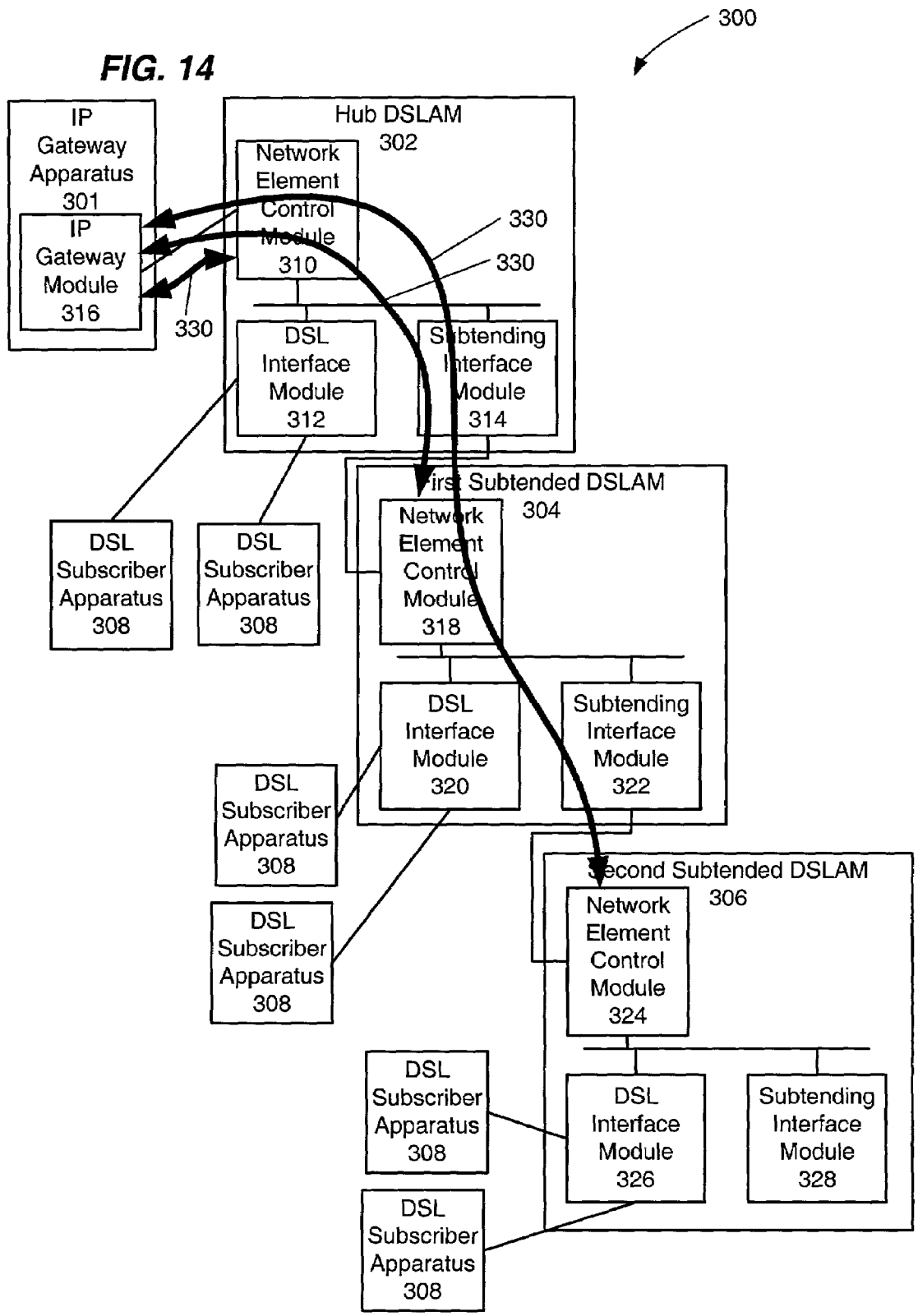
FIG. 14 is a block diagram view depicting DSLAM control connections managed by an IP gateway module of the hierarchical network of network nodes depicted in FIG. 12.

As depicted in FIG. 14, centralized multicast control functionality in accordance with the disclosures made herein enable a control connection 330 to be established between the IP gateway apparatus 301 and each one of the DSLAMS (i.e. the hub DSLAM 302, the first subtended DSLAM 304 and the second subtended DSLAM 306). Accordingly, the IP gateway module 316 is able to instruct the network element control modules (318, 324) of the hub DSLAM 302, the first subtended DSLAM 304 and the second subtended DSLAM 306 to perform functions such as establishing and clearing multicast control connections. One or more network elements of each DSLAM (e.g. network element control modules and/or subtending interface modules) participate in enabling each control connection 330 being established.

Figure 15:
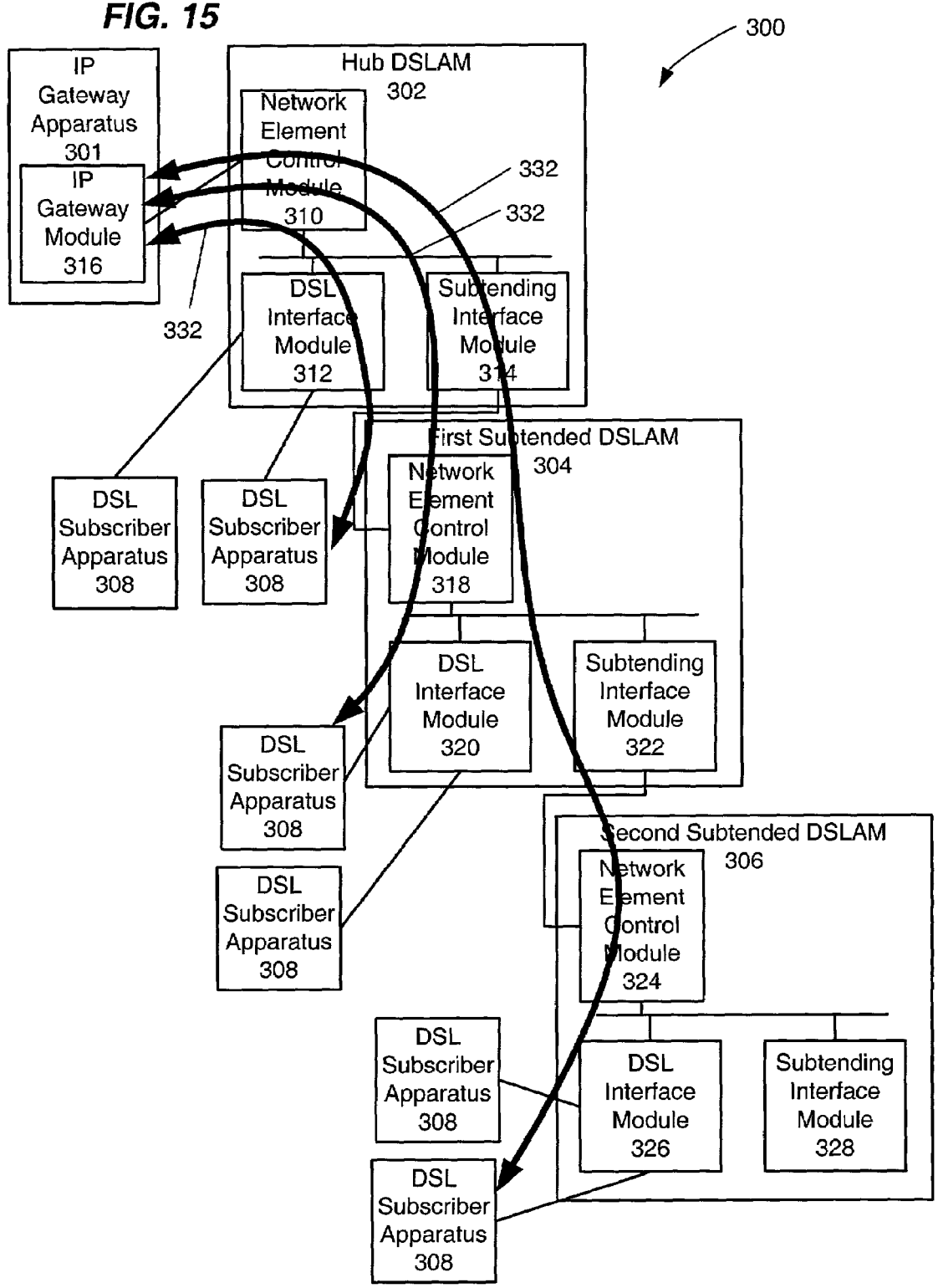
FIG. 15 is a block diagram view depicting DSL subscriber apparatus control connections managed by an IP gateway module of the hierarchical network of network nodes depicted in FIG. 12.

Furthermore, as depicted in FIG. 15, centralized multicast control functionality in accordance with the disclosures made herein enable control connections 332 to be established between the IP gateway apparatus 301 and each DSL subscriber apparatuses 308 of the tree of DSLAMs such that the DSL subscriber apparatuses 308 are able to communicate with the IP gateway apparatus module 316. One or more network elements of each DSLAM (e.g. DSL interface modules, network element control modules and/or subtending interface modules) participate in enabling each control connection 232 being established.

Figure 16:
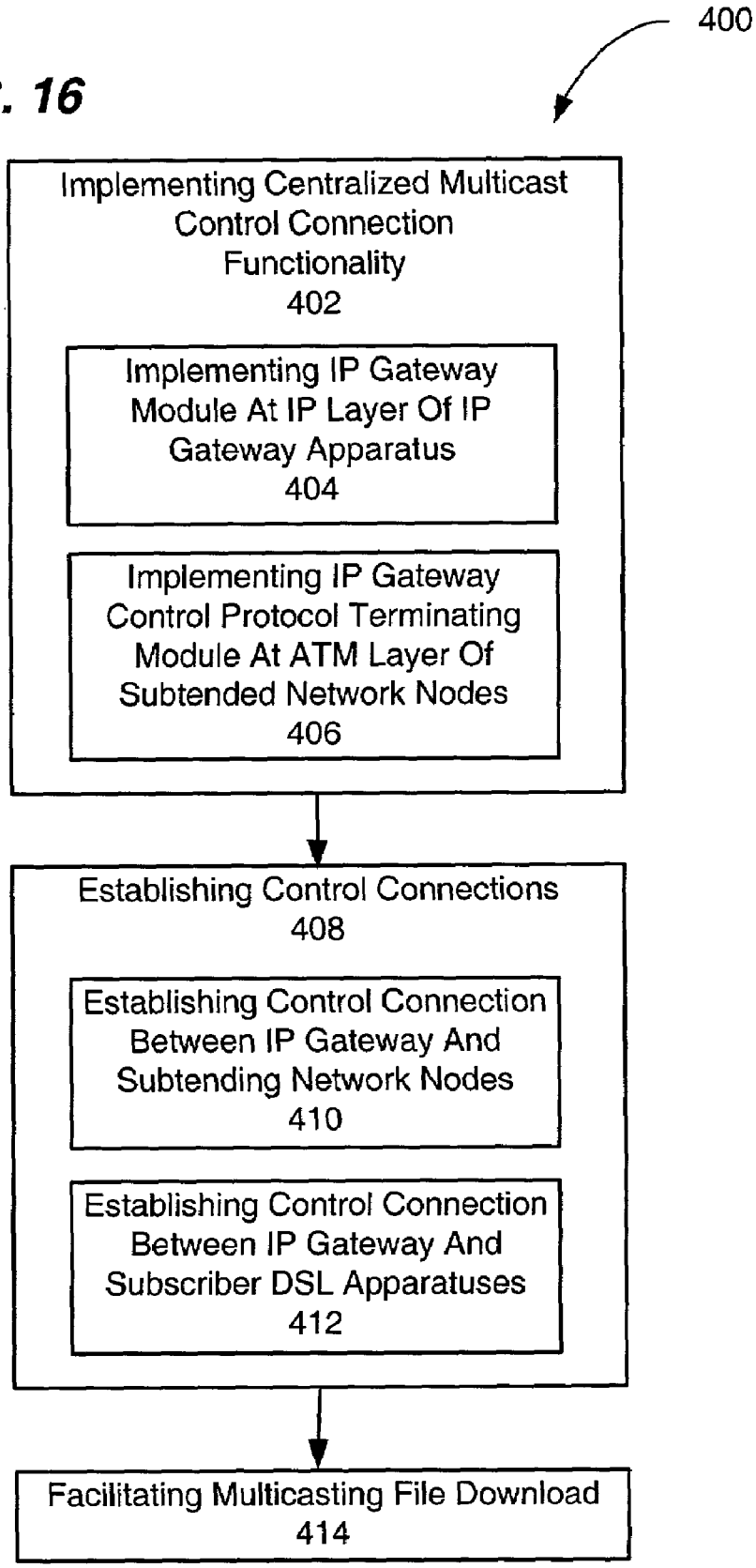
FIG. 16 is a flow diagram view depicting a method for facilitating IP multicasting functionality in accordance with a communication system disclosed herein.

FIG. 16 depicts a method 400 for facilitating IP multicasting functionality in accordance with an embodiment of the disclosures made herein. The method 400 begins at an operation 402 for implementing centralized multicast control functionality. The operation 402 for implementing centralized multicast control functionality includes performing a step 404 for implementing an IP Gateway module at an IP layer of a first network node and performing an operation 404 for implementing a control protocol terminating module at an ATM layer of one or more network nodes (i.e. a second, network node, a third network node, etc) that are in subtending relationship with respect to the first network node. The one or more network nodes are referred to herein as subtending network nodes.

After performing the operation 402 for implementing centralized multicast control functionality, an operation 408 is performed for establishing control connections within the network. Accordingly, the operation 408 for establishing such control connections includes performing a step 410 for establishing a control connection between the first network node and each of the one or more subtending network nodes and performing an operation 412 for establishing a control connection between the first network node and one or more subscriber DSL apparatuses that are themselves subtending from a respective one of the subtending network nodes. After the control connections are established with the one or more subtending network nodes and the one or more Subscriber DSL apparatuses, an operation 414 is capable of being performed for facilitating multicast file download in accordance with known techniques.

The communication systems disclosed herein are capable of supporting various aspects of centralizing Internet Protocol (IP) multicast control functionality, including implementation of point-to-multipoint connections in accordance with embodiments of the disclosures made herein. The term centralized as referred to herein means that such IP multicast control functionality is managed at a single one of a plurality of network nodes. This approach to managing control connections is in contrast to conventional multicast control approaches in which a plurality of network node participate in managing IP multicast control functionality in a node-by-node, hop-by-hop manner. It should be understood that the term centralized does not necessarily refer to a particular location of the network node or apparatus managing such IP multicast control functionality within a network. Accordingly, the network node or apparatus managing such IP multicast control functionality within a network may not be located at a central location within the network.

The communication systems disclosed herein provide a feasible and practical approach to retrofitting IP multicast control capabilities into deployed network nodes that are incapable of supporting IP layer capabilities or that have insufficient IP layer resources for supporting IP multicasting control capabilities. For example, the communication systems disclosed herein enable cost-effective deployment of IP multicasting capabilities in a subtending tree of network elements (e.g. DSLAMS) that operate at an ATM layer. Effectively, IP functionality is simulated at the ATM layer. It is contemplated herein that the centralized IP multicast control functionality may be integrated into the root of a hierarchical tree of ATM capable network nodes (i.e. a DSLAM), at a network node external to the tree, or within tree.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical, mechanical, chemical and electrical changes may be made without departing from the spirit or scope of the invention. For example, process blocks and/or operational blocks shown in the figures could be further combined or divided in any manner without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for facilitating multicast control, comprising:
receiving a request for translating a network element interface identifier associated with a first network element from a first type of network element interface identifier to a second type of network element interface identifier, wherein the request is transmitted for reception by the first network element from a second network element, wherein the first network element is a digital subscriber line access multiplexer (DSLAM), and the first type of network element interface identifier is a conventional identifier, and the second type of network element interface identifier is an identifier which is proprietary to the DSLAM;
translating the network element interface identifier from the first type of network element interface identifier to the second type of network element interface identifier after receiving the request, wherein a translated network element interface identifier corresponding to the second type of network element interface identifier is generated;
informing the second network element of the translated network element interface identifier, wherein the second network element is an IP Gateway; and
storing the translated network element interface identifier for use by the IP Gateway in further communications such that the further communications are free of additional translations.

2. The method of claim 1 wherein translating the network element interface identifier from a first type of network element interface identifier to a second type of network element interface identifier includes translating the network element interface identifier from a human readable type of network element interface identifier to a system readable type of network element interface identifier.

3. The method of claim 1 wherein:
informing includes transmitting a translate acknowledgement message from the first network element to the second network element; and
the translate acknowledgement message includes the translated network element interface identifier.

4. The method of claim 1, further comprising:
receiving a request for creating a designated root of a point-to-multipoint tree after informing the second network element of the translated network element interface identifier.

5. The method of claim 4, further comprising:
confirming an ability to establish the designated root in response to receiving the request for creating the designated root.

6. The method of claim 5 wherein:
the request for creating the designated root includes information capable of enabling the ability to establish the designated root to be confirmed; and
confirming the ability to establish the designated root includes assessing at least a portion of said information capable of enabling the ability to establish the designated root to be confirmed.

7. The method of claim 5, further comprising:
transmitting a root create acknowledgement message to the second network element after confirming the ability to establish the designated root, wherein the root create acknowledgement message includes a root reference identifier of the first network element.

8. The method of claim 7, further comprising;
associating connection-specific information with the root reference identifier.

9. The method of claim 8 wherein associating said connection-specific information with the root reference identifier includes:
associating information selected from a group of connection-specific information consisting essentially of multicast traffic characteristics, preferred traffic paths, alternate traffic paths, traffic priority, external connection identifiers, internal connection identifiers, references to associated data structures, a reference to the peer node which requested creation of the connection, a reference to a list of current leaves associated with the root, and other such information which may be associated with the root reference identifier; and
maintaining said connection-specific information at the first network element.

10. The method of claim 7, further comprising:
receiving a request for adding a designated leaf to the point-to-multipoint tree, wherein the request for adding the designated leaf designates the root reference identifier and designates the translated network element interface identifier.

11. The method of claim 10, further comprising:
performing an add designated leaf operation for adding the designated leaf to the point-to-multipoint tree;
determining a leaf identifier corresponding to the designated leaf in response to successfully performing the add designated leaf operation; and
transmitting an add leaf acknowledgement message for reception by the second network element after determining the leaf identifier, wherein the add leaf acknowledgement message includes the leaf identifier of the designated leaf.

12. The method of claim 11, further comprising:
receiving a request for releasing the designated leaf from the point-to-multipoint tree, wherein the request includes the leaf identifier of the designated leaf; and
facilitating release of the designated leaf from the point-to-multipoint tree after receiving the request for releasing the designated leaf, wherein the leaf identifier is utilized for identifying the designated leaf.

13. The method of claim 1, further comprising:
receiving a request for adding a designated leaf to a first point-to-multipoint tree, wherein the request for adding the designated leaf designates a root reference identifier corresponding to the first point-to-multipoint tree and designates the translated network element interface identifier;

performing an add designated leaf operation for adding the designated leaf to the first point-to-multipoint tree;

determining a leaf identifier corresponding to the designated leaf in response to successfully performing the add designated leaf operation; and transmitting an add leaf acknowledgement message for reception by the second network element, wherein the add leaf acknowledgement message includes the leaf identifier; and receiving a request for switching the designated leaf from the first point-to-multipoint tree to a second point-to-multipoint tree, wherein the request for switching the designated leaf designates the translated network element interface identifier, designates the leaf identifier corresponding to the designated leaf, designated the root reference identifier corresponding to the first point-to-multipoint tree and a root reference identifier corresponding to the second point-to-multipoint tree.

14. A method for implementing multicast control in a point-to-multipoint tree, comprising:

facilitating a translate interface identification operation for translating a network element interface identifier associated with a first network element from a first type of network element interface identifier to a second type of network element interface identifier, wherein a translated network element interface identifier corresponding to the second type of network element interface identifier is generated and is transmitted from the first network element for reception by a second network element, wherein the first network element is a digital subscriber line access multiplexer (DSLAM) and the second network element is an IP Gateway, and the first type of network element interface identifier is a conventional identifier, and the second type of network element interface identifier is an identifier which is proprietary to the DSLAM;

storing the translated network element interface identifier for use by the IP Gateway in further communications such that the further communications are free of additional translations; and facilitating a root creation operation for creating a designated root of a point-to-multipoint tree after initiating the translate interface identification operation, wherein a root reference identifier of the first network element is generated and is transmitted from the first network element for reception by a second network element, wherein the translated network element interface identifier is used for the designated root.

15. The method of claim 14 wherein facilitating the translate interface identification operation includes:

transmitting a request for translating a network element interface identifier associated with the first network element from a first type of network element interface identifier to a second type of network element interface identifier the request for is transmitted for reception by the first network element from the second network element; and translating the network element interface identifier from the first type of network element interface identifier to the second type of network element interface identifier for generating the translated network element interface identifier after receiving the request.

16. The method of claim 14 wherein the translated network element interface identifier is transmitted from the first network element for reception by the second network element in association with a translate acknowledgement message.

17. The method of claim 14 wherein facilitating a root creation operation includes:

transmitting a request for creating a designated root of a point-to-multipoint tree after transmitting the translated network element interface identifier for reception by the second network element;

confirming an ability to establish the designated root in response to receiving the request for creating the designated root at the first network element; and transmitting a root create acknowledgement message to the second network element after confirming the ability to establish the designated root, wherein the root create acknowledgement message includes a root reference identifier of the first network element.

18. The method of claim 17 wherein:

the request for creating the designated root includes information capable of enabling the ability to establish the designated root to be confirmed; and confirming the ability to establish the designated root includes assessing at least a portion of said information capable of enabling the ability to establish the designated root to be confirmed.

19. The method of claim 17 wherein facilitating a root creation operation includes associating connection-specific information with the root reference identifier.

20. The method of claim 19 wherein associating said connection-specific information with the root reference identifier includes:

associating information selected from a group of connection-specific information consisting essentially of multicast traffic characteristics, preferred traffic paths, alternate traffic paths, traffic priority, external connection identifiers, internal connection identifiers, references to associated data structures, a reference to the peer node which requested creation of the connection and a reference to a list of current leaves associated with the root; and maintaining said connection-specific information at the first network element.

21. The method of claim 17, further comprising:

facilitating an add leaf operation for adding a designated leaf to the point-to-multipoint tree.

22. The method of claim 21 wherein facilitating the add leaf operation includes:

receiving by the first network element a request for adding a designated leaf to the point-to-multipoint tree, the request designating the root reference identifier and designating the translated network element interface identifier;

performing an add designated leaf operation for adding the designated leaf to the point-to-multipoint tree, wherein the root reference identifier is utilized for identifying the point-to-multipoint tree;

determining a leaf identifier corresponding to the designated leaf in response to successfully performing the add designated leaf operation; and transmitting an add leaf acknowledgement message including the leaf identifier of the designated leaf for reception by the second network element after determining the leaf identifier.

23. The method of claim 22, further comprising:
  facilitating a release leaf operation for releasing the designated leaf from the point-to-multipoint tree, wherein the leaf identifier is utilized for determining the designated leaf.

24. The method of claim 23 wherein facilitating the release leaf operation includes:
  receiving a request for releasing the designated leaf from the point-to-multipoint tree, wherein the request includes the leaf identifier of the designated leaf.

25. The method of claim 14, further comprising:
  facilitating a switch leaf operation for switching a designated leaf from a first point-to-multipoint tree and adding the leaf to a second point-to-multipoint tree.

26. The method of claim 25 wherein facilitating the switch leaf operation includes:
  receiving a request for switching the designated leaf from the first point-to-multipoint tree to a second point-to-multipoint tree, wherein the request for switching the designated leaf designates the translated network element interface identifier, designates the leaf identifier corresponding to the designated leaf, designated a first root reference identifier corresponding to the first point-to-multipoint tree and a second root reference identifier corresponding to the second point-to-multipoint tree;

facilitating a release leaf operation for releasing the designated leaf from the first point-to-multipoint, the operation utilizing the first root reference identifier for identifying the first point-to-multipoint; and facilitating an add leaf operation for adding the designated leaf to the second point-to-multipoint tree, the operation utilizing the second root reference identifier for identifying the second point-to-multipoint.

* * * * *